United States Patent
Hamada et al.

(10) Patent No.: US 10,296,803 B2
(45) Date of Patent: May 21, 2019

(54) IMAGE DISPLAY APPARATUS, IMAGE DISPLAY METHOD, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventors: Shinichiro Hamada, Kanagawa (JP); Kunio Osada, Tokyo (JP); Isao Mihara, Tokyo (JP); Yojiro Tonouchi, Tokyo (JP); Kaoru Suzuki, Kanagawa (JP)

(73) Assignees: KABUSHIKI KAISHA TOSHIBA, Tokyo (JP); TOSHIBA SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 14/454,051

(22) Filed: Aug. 7, 2014

(65) Prior Publication Data
US 2015/0116349 A1 Apr. 30, 2015

(30) Foreign Application Priority Data
Oct. 31, 2013 (JP) ................................. 2013-227350

(51) Int. Cl.
*G06T 5/00* (2006.01)
*G06K 9/46* (2006.01)
(Continued)

(52) U.S. Cl.
CPC ........... *G06K 9/46* (2013.01); *G06K 9/00671* (2013.01); *G06K 9/3258* (2013.01);
(Continued)

(58) Field of Classification Search
CPC .... G06K 9/46; G06K 9/00671; G06K 9/3258; G06K 2209/01; G06F 2203/04806;
(Continued)

(56) References Cited

U.S. PATENT DOCUMENTS 4,744,026 A 5/1988 Vanderbei
7,792,353 B2 9/2010 Forman et al.
(Continued)

FOREIGN PATENT DOCUMENTS

CN 100444086 12/2008
EP 2 423 882 2/2012
(Continued)

OTHER PUBLICATIONS

Extended European Search Report for European Patent Application No. 14180631.5-1901 dated Mar. 2, 2015, 10 pages.
(Continued)

*Primary Examiner* — Samantha (Yuehan) Wang
(74) *Attorney, Agent, or Firm* — Amin, Turocy & Watson LLP

(57) ABSTRACT

According to an embodiment, an image display apparatus includes a detection unit, a generation unit, and a display control unit. The detection unit detects areas to be focused in an input image. The generation unit generates a sub image by performing correction for improving visibility on an image of the detected area. The correction includes at least one of size correction for adjusting size of the image of the area, color correction for adjusting color of the image of the area, and distortion correction for transforming the image of the area so as to be an image acquired by viewing the image of the area from the front side. The display control unit displays the generated sub image on a display device
(Continued)

together with the input image in a form that accompanies a screen representation representing a correspondence relation with the area.

12 Claims, 26 Drawing Sheets

(51) Int. Cl.
*G06K 9/62* (2006.01)
*G06K 9/00* (2006.01)
*G06K 9/32* (2006.01)

(52) U.S. Cl.
CPC ......... *G06K 9/6254* (2013.01); *G06K 9/6256* (2013.01); *G06K 9/6282* (2013.01); *G06K 2009/4666* (2013.01); *G06K 2209/011* (2013.01)

(58) Field of Classification Search
CPC ... G06F 3/048; G06F 17/2765; H04N 19/543; H04N 1/393; G06T 3/40; G06T 2219/2004; G01C 21/3682
See application file for complete search history.

(56) References Cited

U.S. PATENT DOCUMENTS

| | | | |
|---|---|---|---|
| 8,452,047 B2 | 5/2013 | Lee et al. | |
| 9,310,218 B2* | 4/2016 | Choi | G01C 21/3679 |
| 2002/0159642 A1 | 10/2002 | Whitney | |
| 2008/0309596 A1 | 12/2008 | Matsui et al. | |
| 2010/0123782 A1* | 5/2010 | Yata | H04N 5/232 348/169 |
| 2010/0135562 A1 | 6/2010 | Greenberg et al. | |
| 2012/0050316 A1 | 3/2012 | Rainisto et al. | |
| 2012/0220855 A1* | 8/2012 | Zhang | A61B 5/0037 600/410 |
| 2013/0002585 A1* | 1/2013 | Jee | G06F 3/0488 345/173 |
| 2013/0216094 A1* | 8/2013 | DeLean | G06K 9/00335 382/103 |
| 2013/0294653 A1* | 11/2013 | Burry | G06K 9/3258 382/105 |
| 2014/0218611 A1* | 8/2014 | Park | G06F 3/0481 348/565 |
| 2015/0070386 A1* | 3/2015 | Ferens | G06F 3/011 345/633 |
| 2015/0371102 A1* | 12/2015 | Yang | G06K 9/3241 382/103 |

FOREIGN PATENT DOCUMENTS

| | | |
|---|---|---|
| JP | 06-325205 | 11/1994 |
| JP | 2002-109510 | 4/2002 |
| JP | 2003-108925 | 4/2003 |
| JP | 2006-164031 | 6/2006 |
| JP | 2008-278458 | 11/2008 |
| JP | 2012-075044 | 4/2012 |
| JP | 2012-108689 | 6/2012 |
| JP | 2013-141091 | 7/2013 |
| WO | 2001/026041 | 4/2001 |
| WO | 2010-086610 | 8/2010 |

OTHER PUBLICATIONS

David Cohn. "Active Learning" in: "Encyclopedia of Machine Learning", edited by Claude Sammut and Geoffrey I. Webb, published by Springer, Jan. 1, 2010, New York, p. 10.

Xiangrong Chen, et al. "Detecting and Reading Text in Natural Scenes", in Proceedings of the 2004 IEEE Computer Society Conference on Computer Vision and Pattern Recognition, Jun. 27-Jul. 2, 2004, Washington, DC, vol. 2, pp. 366-373.

David W. Aha, et al. "Instance-Based Learning Algorithms", Machine Learning, Jan. 1991, pp. 37-66, vol. 6, Issue 1, Kluwer Academic Publishers, Boston.

* cited by examiner

FIG.4
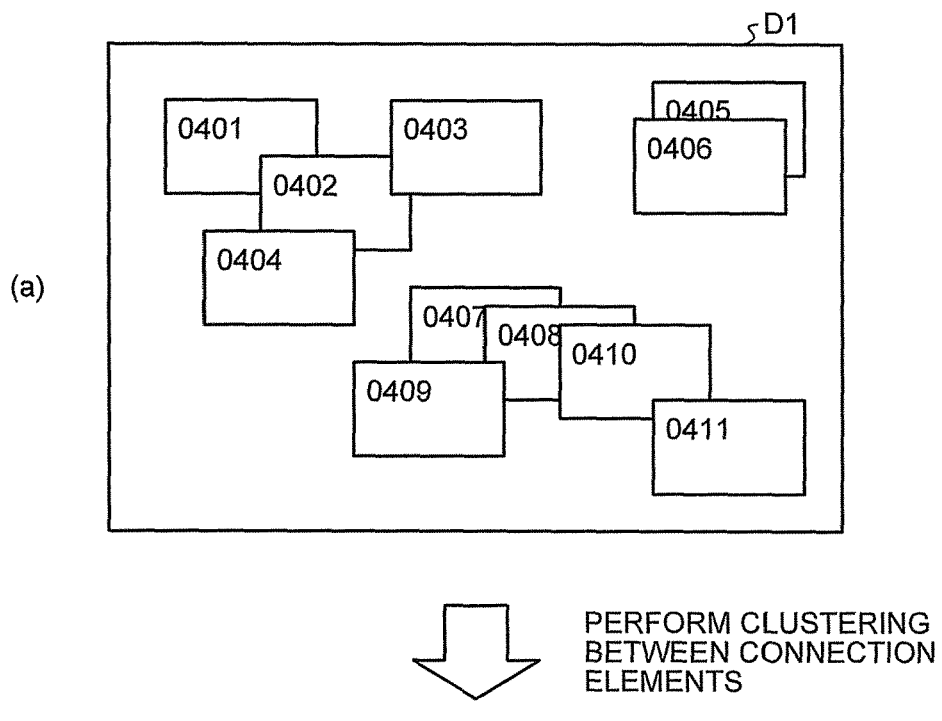
(a)
PERFORM CLUSTERING BETWEEN CONNECTION ELEMENTS
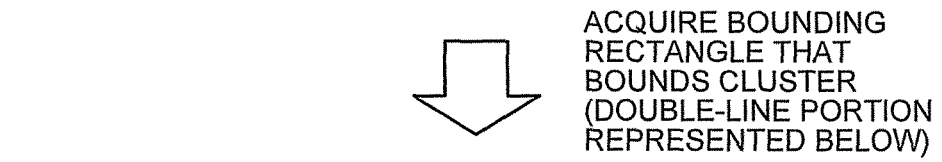
{0401,0402,0403,0404} 0.75, {0405,0406} 0.80,
{0407.0408,0409,0410,0411} 0.55
ACQUIRE BOUNDING RECTANGLE THAT BOUNDS CLUSTER (DOUBLE-LINE PORTION REPRESENTED BELOW)
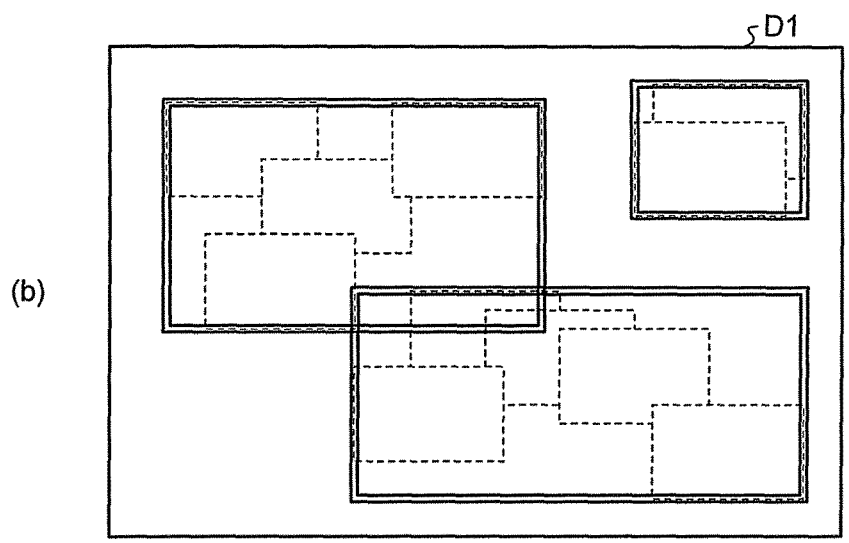
(b)

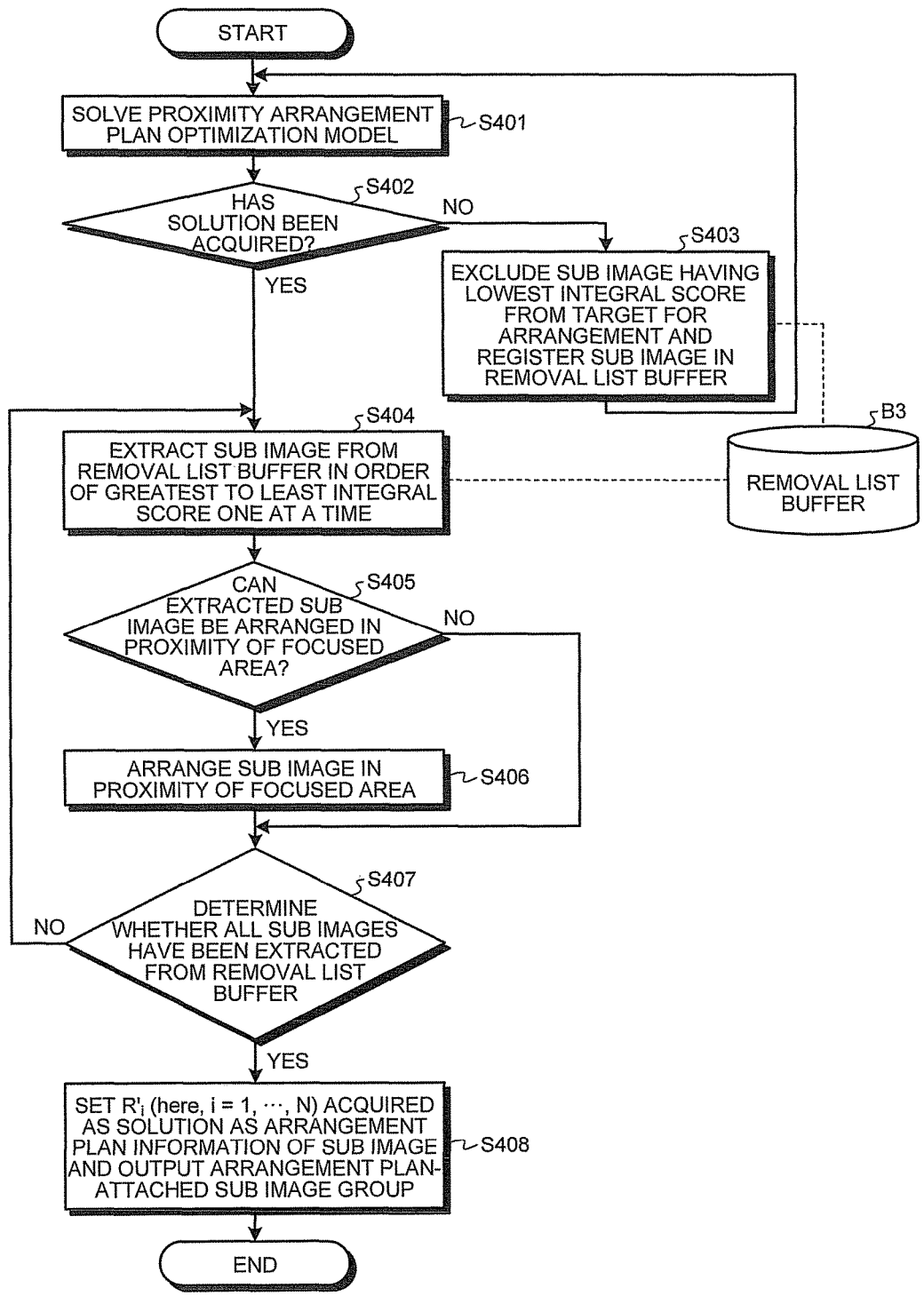

FIG.9

$$\arg\min_{\{R'_i | i=1,\cdots,N\}} \sum_{i=1}^{N} D(R_i, R'_i)$$

s.t.

$\hat{i} = \arg\min_{j=1,\cdots,N} D(R_i, R'_j) \quad (i=1,\cdots,N)$ $D(R_i, R'_i) > C \quad (i=1,\cdots,N)$ $\text{overlap}(\hat{R}_i, \hat{R}_j) = \text{false} \quad (i \neq j)$ where

| | |
|---|---|
| N | SUB IMAGE NUMBER |
| $R_i$ | FOCUSED AREA (i = 1..N) |
| $R'_i$ | ARRANGEMENT PLANNED AREA OF SUB IMAGE (i = 1..N) |
| $\hat{R}_i$ | SUM SET OF AREA IMAGE GROUP AND SUB IMAGE GROUP (i = 1..2N) |
| overlap(·) | RETURN true IN CASE WHERE GIVEN TWO AREAS OVERLAP EACH OTHER AND OTHERWISE RETURN false |
| D(·) | DISTANCE BETWEEN GIVEN TWO AREAS |
| C | CONSTANT |

FIG.11
(a) CASE 1
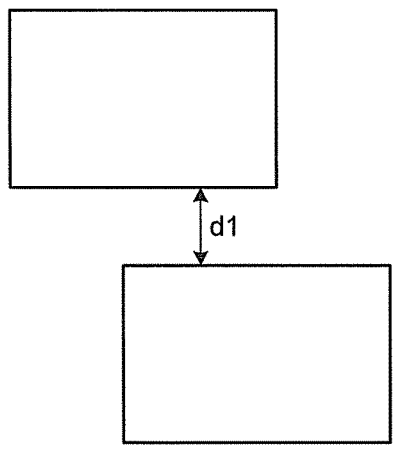
(b) CASE 2
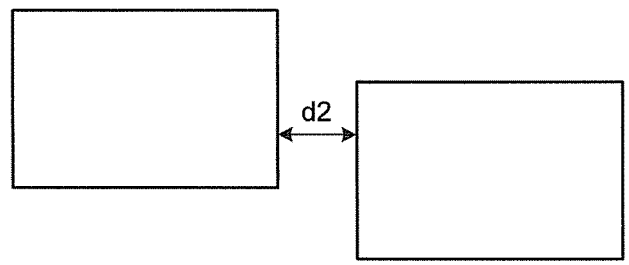

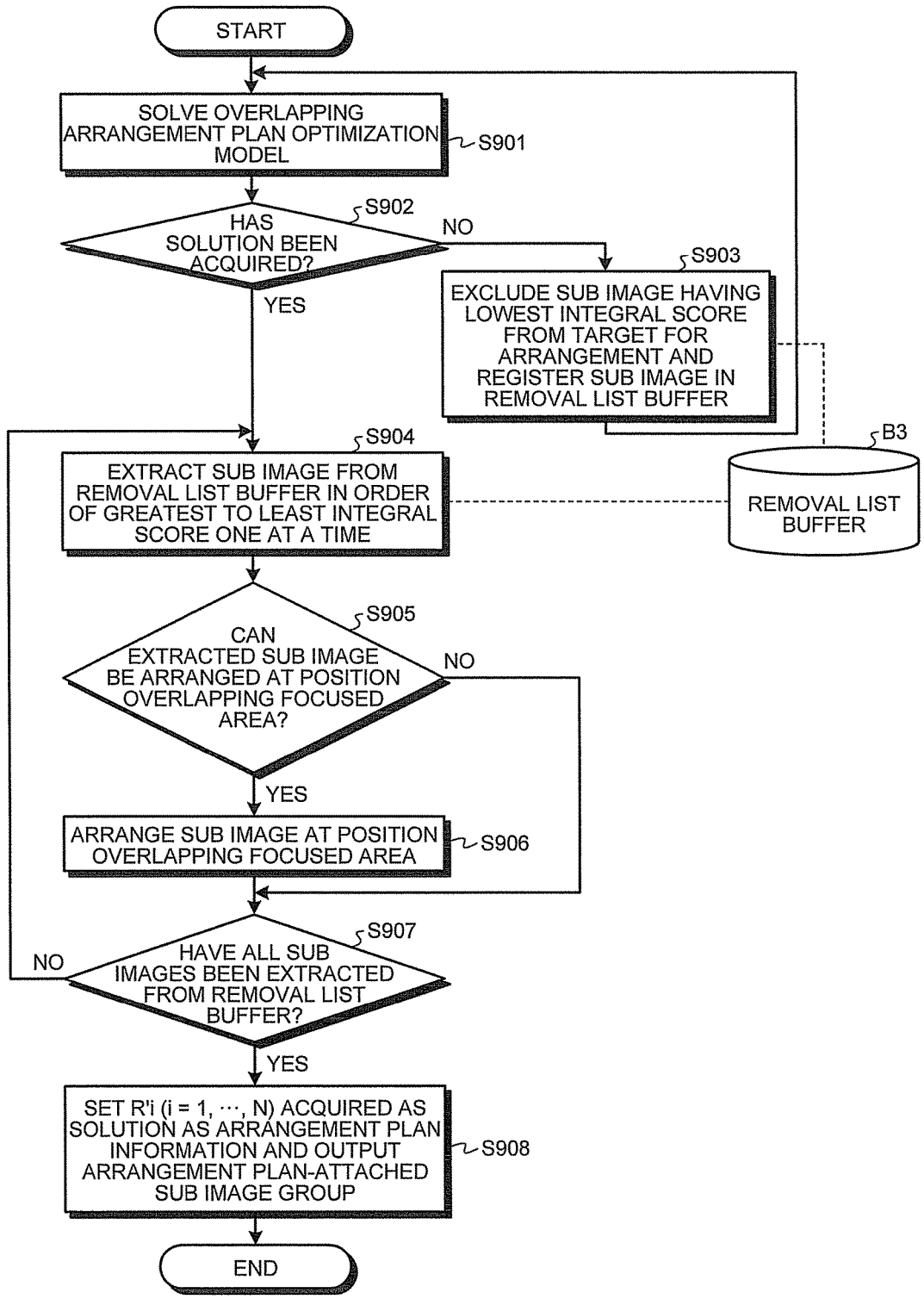

FIG.20

$$\underset{\{R'_i | i=1,\cdots,N\}}{\arg\min} \sum_{i=1}^{N} \alpha D(R_i, R'_i) + \beta S(R_i, R'_i)$$

s.t.

$i = \underset{j=1,\cdots,N}{\arg\min} D(R_i, R'_j) \ (i=1,\cdots,N)$ $\text{overlap}(R'_i, R'_j) = \text{false} \ (i \neq j)$ where

| | |
|---|---|
| N | SUB IMAGE NUMBER |
| $R_i$ | FOCUSED AREA (i = 1..N) |
| $R'_i$ | ARRANGEMENT PLANNED AREA OF SUB IMAGE (i = 1..N) |
| overlap(·) | RETURN true IN CASE WHERE GIVEN TWO AREAS OVERLAP EACH OTHER AND OTHERWISE RETURN false |
| D(·) | DISTANCE BETWEEN GIVEN TWO AREAS |
| S(·) | AREA OF AREA IMAGE THAT IS HIDDEN BY SUB IMAGE |
| $\alpha, \beta$ | CONSTANT OF ZERO OR MORE, $\alpha + \beta = 1$ |

IMAGE DISPLAY APPARATUS, IMAGE DISPLAY METHOD, AND COMPUTER PROGRAM PRODUCT

CROSS-REFERENCE TO RELATED APPLICATIONS

This application is based upon and claims the benefit of priority from Japanese Patent Application No. 2013-227350, filed on Oct. 31, 2013; the entire contents of which are incorporated herein by reference.

FIELD

Embodiments described herein relate generally to an image display apparatus, an image display method, and a computer program product.

BACKGROUND

Conventionally, a technology for performing a recognition process such as a character recognition process or an object recognition process on an input image and overlaying a result of the recognition process on the input image has been known. An image display apparatus to which such a technology is applied can present a target, which is included in an input image and is assumed to attract user's interest, to the user in an easily understandable form. However, since it takes a time to acquire the result of the recognition process for an image, for example, for an application having a scene image captured using a camera of a mobile terminal as an input image or the like, enhancement is requested from the viewpoint of the responsiveness.

BRIEF DESCRIPTION OF THE DRAWINGS

FIG. 4 is a diagram for explaining the process of Steps S108 and S109 illustrated in FIG. 3;

FIG. 8 is a flowchart that illustrates an example of the processing sequence of a sub-image proximity arrangement planner;

FIG. 9 is a diagram that illustrates an example of a proximity arrangement plan optimization model;

FIG. 11 is a diagram for explaining methods of calculating a distance between an area to be focused (area image) and a corresponding sub image;

FIG. 19 is a flowchart that illustrates an example of the processing sequence of a sub-image overlapping arrangement planner;

FIG. 20 is a diagram that illustrates an example of an overlapping arrangement plan optimization model;

DETAILED DESCRIPTION

Figure 1:
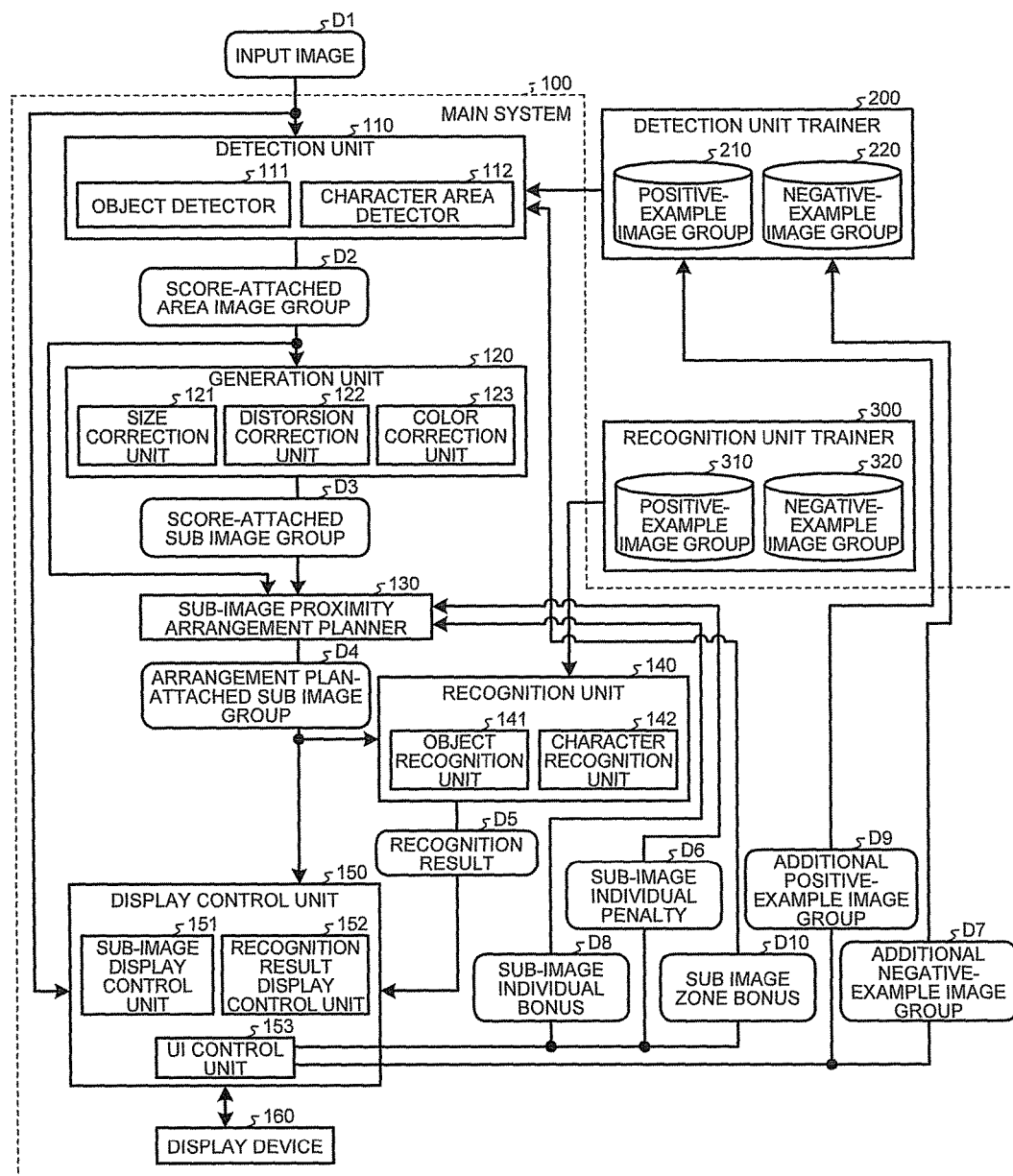
FIG. 1 is a block diagram that illustrates an example of the configuration of an image display apparatus according to a first embodiment.

According to an embodiment, an image display apparatus includes a detection unit, a generation unit, and a display control unit. The detection unit detects areas to be focused in an input image. The generation unit generates a sub image by performing correction for improving visibility on an image of the detected area to be focused. The correction includes at least one of size correction for adjusting size of the image of the area to be focused, color correction for adjusting color of the image of the area to be focused, and distortion correction for transforming the image of the area to be focused so as to be an image acquired by viewing the image of the area to be focused from the front side. The display control unit displays the generated sub image on a display device together with the input image in a form that accompanies a screen representation representing a correspondence relation with the area to be focused.

Hereinafter, various embodiments will be described in detail. The embodiments described below are examples applied to an image display apparatus that has a function for receiving a scene image, for example, captured by a camera, performing a recognition process such as a character recognition process or an object recognition process on the scene image, and displaying a result of the recognition process together with the scene image. Hereinafter, such a function will be referred to as scene image recognition. An image display apparatus that can be applied as an embodiment is not limited to the image display apparatus having the scene image recognition, but all the image display apparatuses each displaying an input image may be applied as the embodiment.

One of typical applications of the scene image recognition is an application to a camera-attached mobile terminal such as a smartphone. When a user holds the camera to a scene, the terminal performs recognition of characters or objects on the scene image acquired by the camera and displays an image acquired by overlapping a result of the recognition such as a text string or the like on the scene image on the display device. In addition, the application to an in-vehicle device is one of the typical applications. The recognition of characters or objects is performed on a scene image acquired by a camera attached to the front of a vehicle, and a result of the recognition is overlaid on the scene of a front window.

In the scene image recognition, an error of incorrect recognition in the recognition process such as a character recognition process or an object recognition process or an error of incorrect detection at the time of performing the detection on an area to be focused (hereinafter, referred to as a focused area), in which characters or objects that are targets for the recognition process are included, from a scene image may occur. Accordingly, in order to achieve a practical application, it is required to prepare a recovery function [A1] for incorrect recognition and a recovery function [A2] for incorrect detection of the focused area.

In addition, a scene image handled in the scene image recognition tends to be a wide-area image and have high resolution. Accordingly, in the scene image recognition to be performed afterwards, a further countermeasure for problems represented below is requested.

In accordance with an increase in the resolution of the scene image, a time required for the recognition process such as a character recognition process and an object recognition process increases, and accordingly, there is a problem in deterioration in the responsiveness. Since the responsiveness has a strong influence on the convenience of the scene image recognition, it is preferable to achieve a function [B] for supplementing the deterioration in the responsiveness according to the recognition process.

As the scene image is formed as a wide-area image, the ratio of the focused area to the whole scene image becomes small. In addition, the number of cases where a plurality of focused areas is detected from one scene image increases. In such a situation, by only simply overlaying the result of the recognition on the scene image, the result of the recognition may be easily left unnoticed. Accordingly, it is preferable to achieve a function [C] for appropriately leading the observation.

Since the size of the display device (particularly, the display device of the mobile terminal) is limited while the scene image keeps getting high resolution, an image of the focused area is fine, and, particularly, it is difficult for an old person or a visually-impaired person to recognize a target present in the focused area. Accordingly, there is a demand to achieve a function [D] for supporting the browsability of the focused area.

In this embodiment, an image display according to scene image recognition realizing all the above-described functions [A1], [A2], [B], [C], and [D] is proposed.

An image display apparatus according to an embodiment, first, detects all the focused areas each including a character that is a target for character recognition or an object that is a target for object recognition from an input image (in this embodiment, a scene image). Next, the image display apparatus performs corrections for improving the visibility such as size correction, distortion correction, and color correction on the image of each detected focused area, thereby generating a sub image corresponding to each focused area. Next, the image display apparatus displays each generated sub image together with the input image on a display device by using a screen representation by which a correspondence relation with a focused area that is the origin of the sub image can be known. At a time point when the recognition process ends, the image display apparatus performs a recognition process on characters and objects included in each generated sub image and further displays a result of the recognition on the display device by using a screen representation by which a correspondence relation with the sub image can be known.

In this way, before performing the recognition process on characters and objects included in the focused area, the image display apparatus according to the embodiment generates a sub image in which the visibility of an image of the focused area is improved and displays the generated sub image on the display device in such a way that the correspondence relation with the focused area can be known. Accordingly, the sub image achieves the role of a preview of the result of the recognition, and the function [B] for supplementing the deterioration in the responsiveness according to the recognition process is achieved. In addition, since the sub image is displayed in such a way that the correspondence relation with the focused area can be known, the function [C] for appropriately leading the observation is achieved. Furthermore, since the sub image is an image in which the visibility of the image of the focused area is improved, the function [D] for supporting the browsability of the focused area is achieved as well.

In addition, in a case where there is an error in the recognition process for characters or objects, a correct solution can be checked by referring to the sub image, whereby the recovery function [A1] for incorrect recognition is achieved.

The image display apparatus according to the embodiment may be configured to select a focused area on which the recognition process is performed in accordance with a rule set in advance among focused areas detected from an input image. In such a case, it is preferable that a sub image (first sub image) generated from the focused area, which is selected for performing the recognition process, and a sub image (second sub image) generated from a focused area on which the recognition process is not performed are displayed on the display device in mutually-different display forms. For example, the first sub image is displayed as an image, to which an "X" button is added to the upper right side thereof, having low transparency, and the second sub image is displayed as an image having transparency (the input image displayed below is seen through the sub image) higher than the first sub image.

In such a case, when the user determines that a focused area corresponding to the first sub image is not to be the target for the recognition process, for example, by operating the "X" button, the user can change the focused area to be handled not as the target for the recognition process. In addition, when the user determines that a focused area corresponding to the second sub image needs to be set as the target for the recognition process, for example, by clicking on an area in which the second sub image is arranged, the user can change the focused area to be handled as the target for the recognition process. Such a user's operation is not only reflected on the screen display at that time point but also used as a case for retraining the detection unit that detects a focused area, whereby there is an advantage of the improvement of the detection system in subsequent uses. In this way, the recovery function [A2] for incorrect detection of the focused area is achieved.

As above, the image display apparatus according to the embodiment achieves all the recovery function [A1] for incorrect recognition, the recovery function [A2] for incorrect detection of a focused area, the function [B] for supplementing the deterioration in the responsiveness according to the recognition process, the function [C] for leading appropriate observation, and the function [D] for supporting the browsability of a focused area, and a target assumed to attract user's interest, which is included in the input image, can be presented to the user in an easily understandable form. Hereinafter, a specific example of the image display apparatus according to the embodiment will be described in more detail with reference to the drawings.

First Embodiment

FIG. 1 is a block diagram that illustrates an example of the configuration of an image display apparatus according to a first embodiment. The image display apparatus according to the first embodiment, as illustrated in FIG. 1, includes a main system 100, a detection unit trainer 200, and a recognition unit trainer 300.

The main system 100 is a system that forms the core of the image display apparatus according to this embodiment. The main system 100 detects a focused area from an input image and generates a sub image by performing correction for improving the visibility of an image of the detected focused area. Then, the main system 100 displays the generated sub image together with the input image. In addition, the main system 100 performs a recognition process on the detected focused area and displays a result of the recognition.

The detection unit trainer 200 and the recognition unit trainer 300 are subsystems that train discriminative model groups used for the detection function and the recognition function of the main system 100. The detection unit trainer 200 and the recognition unit trainer 300A may perform process for training the discriminative model groups in advance once before the main system 100 is used. However, the process may be performed in accordance with a call from the main system 100 during the use of the main system 100.

Hereinafter, the main system 100 will be described in detail, and in the description, the detection unit trainer 200 and the recognition unit trainer 300 will be mentioned as well.

As illustrated in FIG. 1, the main system 100 includes: a detection unit 110; a generation unit 120; a sub-image proximity arrangement planner 130; a recognition unit 140; a display control unit 150; and a display device 160. In FIG. 1, round-corner rectangles represent input/output data of the above-described modules 110 to 150 that configure the main system 100.

The detection unit 110 receives an input image D1 and detects all the focused areas that are areas in which targets to be focused are present from the input image D1. Then, the detection unit 110 outputs images of the focused areas detected from the input image D1 together with scores at the time of detection. The outputs of the detection unit 110 will be referred to as a score-attached area image group D2.

Figure 2:
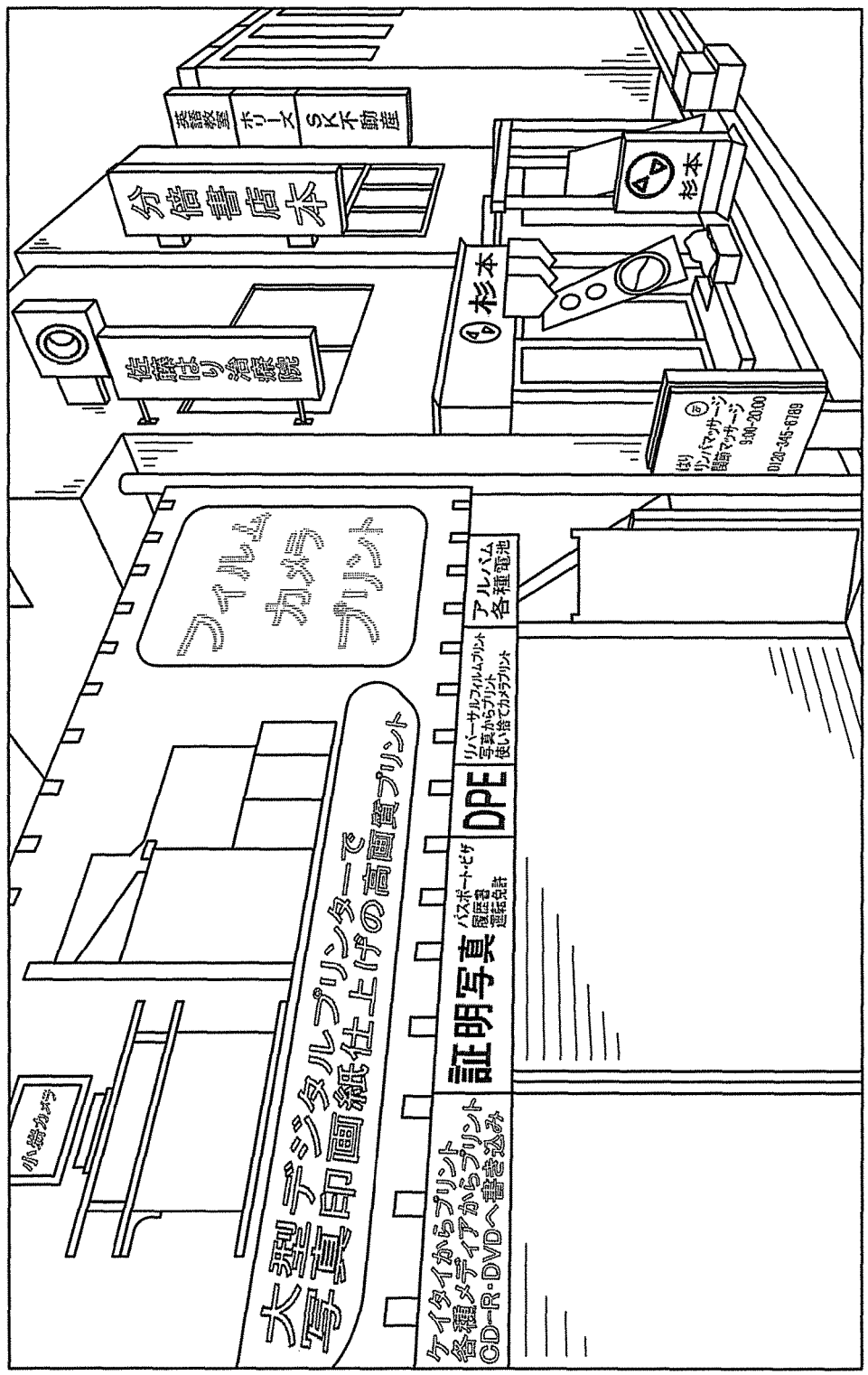
FIG. 2 is a diagram that illustrates a specific example of an input image.

FIG. 2 is a diagram that illustrates a specific example of the input image D1. In this embodiment, a scene image captured by a camera is set as the input image D1. Examples of the target to be focused include objects such as a dog, a cat, a food, and a logo mark in addition to characters.

In this embodiment, a design is employed in which each of objects having a common property is processed by one independent sub module. As an example, logo marks and characters are assumed to be detection targets, and the logo marks are detected by an object detector 111, and characters are detected by a character area detector 112.

Detection results acquired by the object detector 111 and the character area detector 112 are output as the score-attached area image group D2. An image of an area including a logo mark and an image of a character area are output in a distinguishable state, and accordingly, actually two kinds of outputs are assumed to be present. However, the outputs are represented together as the score-attached area image group D2 herein.

The score-attached area image group D2 is an image group forming a part of the input image D1 and has a position (XY coordinates) and size. In contrast to this, a score-attached sub image group D3 to be described later is independent from the input image D1 and has size, but the position (XY coordinates) thereof is undefined until an arrangement process is performed.

Figure 3:
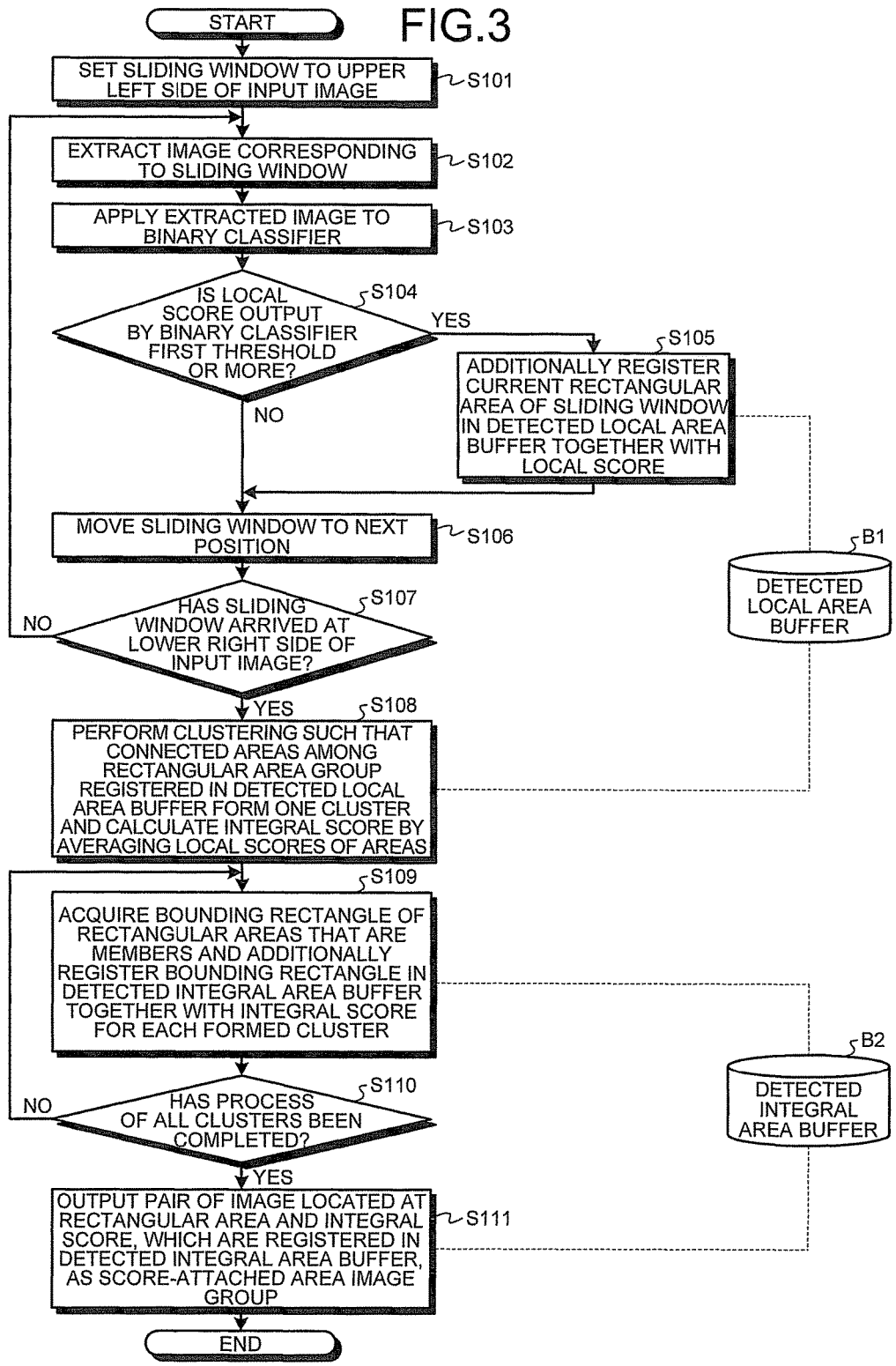
FIG. 3 is a flowchart that illustrates an example of the processing sequence of an object detector.

FIG. 3 is a flowchart that illustrates an example of the processing sequence of the object detector 111. When the input image D1 is input, the object detector 111 performs the process of Steps S101 to S111 as below and outputs the score-attached area image group D2.

Step S101: The object detector 111 sets a sliding window to the upper left side of the input image D1.

Step S102: The object detector 111 extracts an image that corresponds to the sliding window.

Step S103: The object detector 111 applies the extracted image to a binary classifier. The binary classifier determines whether or not the target image is a part of an object and outputs a score that represents a certainty factor. The score that is output by the binary classifier is called a local score.

Step S104: The object detector 111 determines whether or not the local score output by the binary classifier is a first threshold or more. Then, the process proceeds to Step S105 in a case where the result of the determination is "Yes", and the process proceeds to Step S106 in a case where the result of the determination is "No".

Step S105: the object detector 111 additionally registers a current rectangular area of the sliding window in a detected local area buffer B1 together with a local score.

Step S106: The object detector 111 moves the sliding window to the next position.

Step S107: The object detector 111 determines whether or not the sliding window arrives at the lower right side of the input image D1. Then, in a case where the result of the determination is "Yes", the process proceeds to Step S108, and, in a case where the result of the determination is "No", the process proceeds to Step S102.

Step S108: The object detector 111 performs clustering such that connected areas among rectangular area groups registered in the detected local area buffer B1 form one cluster and calculates an integral score by averaging the local scores of the areas. In addition, in the calculation of the average, weighting based on the area may be performed.

Step S109: The object detector 111, for each cluster generated in Step S108, acquires a bounding rectangle of rectangular areas that are members of the cluster and additionally registers the bounding rectangles in a detected integral area buffer B2 together with the integral score.

Step S110: the object detector 111, for all the clusters generated in Step S108, determines whether or not the process of Step S109 has been completed. Then, in a case where the result of the determination is "Yes", the process proceeds to Step S111, and, in a case where the result of the determination is "No", the process is returned to Step S109.

Step S111: The object detector 111 outputs a pair of an image located at each rectangular area and an integral score, which are registered in the detected integral area buffer B2, as the score-attached area image group D2.

FIG. 4 is a diagram for explaining the process of Steps S108 and S109 described above. In the example illustrated in FIG. 4, in Step S108 described above, clustering is performed such that rectangular areas 0401, 0402, 0403, and 0404, rectangular areas 0405 and 0406, and rectangular areas 0407, 0408, 0409, 0410, and 0411 illustrated in part (a) in FIG. 4 each form one cluster. Then, 0.75 is calculated as the integral score of the cluster of the rectangular areas 0401, 0402, 0403, and 0404, 0.80 is calculated as the integral score of the cluster of the rectangular areas 0405 and 0406, and 0.55 is calculated as the integral score of the cluster of the rectangular areas 0407, 0408, 0409, 0410, and 0411. In addition, in Step S109, as illustrated in part (b) in FIG. 4, by acquiring a bounding rectangle for each cluster, a focused area (integral area) including individual objects is detected and is registered in the detected integral area buffer B2 together with the integral score. Here, as the value of the integral score is large, it represents that the certainty factor for the inclusion of an object in the focused area is high.

The binary classifier used in Step S103 described above uses a discriminative model trained by the detection unit trainer 200. Accordingly, it is necessary to execute the detection unit trainer 200 once before the use of the main system 100 so as to generate the discriminative model.

This discriminative model is prepared for each category of recognition targets such as the discriminative model of the logo mark and the discriminative model of the character. The training of the discriminative model, which is performed by the detection unit trainer 200, is performed by using a positive-example image group 210 and a negative-example image group 220. The positive-example image group 210 is an image group acquired by hollowing out images, in which a target of a corresponding category is included, at the size of the sliding window, and the negative-example image group 220 is an image group acquired by hollowing out images, in which a target of a corresponding category is not included, at the size of the sliding window. By using these as positive and negative examples, the discriminative model of the binary classifier such as a support vector machine (SVM) is trained.

The character area detector 112 can detect a character area from the input image D1 and output the score-attached area image group D2 using the almost same method as that of the object detector 111 described above. Thus, detailed description of the process performed by the character area detector 112 will not be presented.

Figure 5:
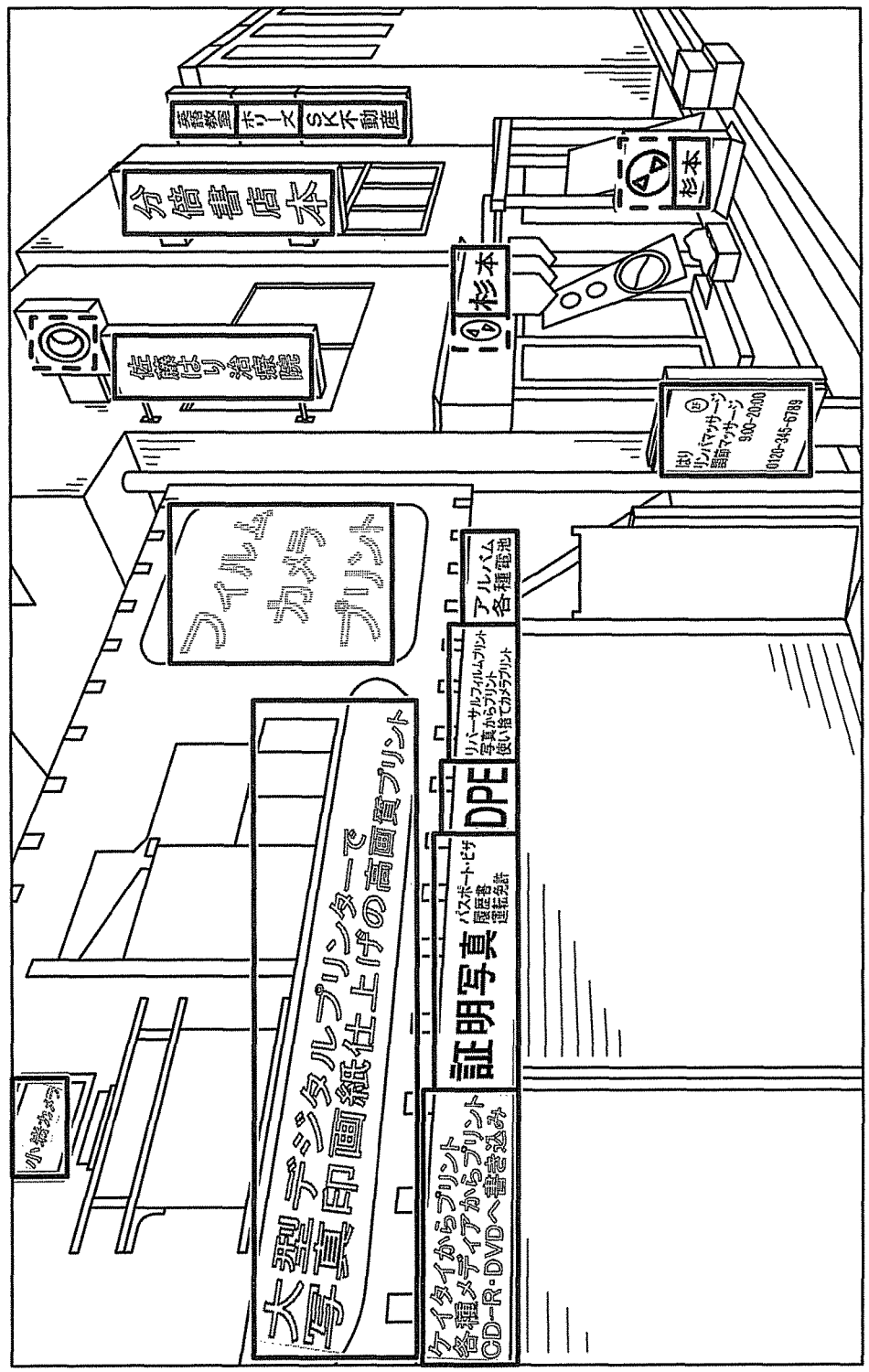
FIG. 5 is a diagram that illustrates an example of a detection result of a case where the input image illustrated in FIG. 2 is processed by a detection unit.

FIG. 5 is a diagram that illustrates an example of a detection result of a case where the input image D1 illustrated in FIG. 2 is processed by the detection unit 110 (the object detector 111 and the character area detector 112). In FIG. 5, each area surrounded by solid lines is a focused area detected by the character area detector 112, and each area surrounded by broken lines is a focused area detected by the object detector 111.

The generation unit 120 receives the score-attached area image group D2, generates a sub image by performing correction for improving the visibility on each area image included in the score-attached area image group D2, and outputs a score-attached sub image group D3 acquired by combining an integral score with each sub image.

In this embodiment, as the correction for improving the visibility, three kinds including size correction, distortion correction, and color correction are prepared, and at least one thereof is applied. Three sub modules of a size correction unit 121, a distortion correction unit 122, and a color correction unit 123 respectively perform the above-described three corrections and are interfaces each receiving an image as an input and outputting an image that is a result of the correction. In a case where two or more corrections are applied, the inputs/outputs of the sub modules may be combined in series. Hereinafter, the processes of the sub modules will be individually described.

The size correction unit 121 has a function for zooming up or zooming down an input image to an easily viewing size. For example, in a case where a character area detected by the character area detector 112 of the detection unit 110 is very small, there are cases where it is difficult for a person to visually recognize the content thereof. In such cases, the size correction unit 121 outputs a result of the correction acquired by zooming up the character area to size that is easily viewable to a person. In addition, as one of methods for determining an appropriate size, there is a method in which a rule relating to the size is determined in advance such as a method in which a range to be filled is determined in advance with respect to the area acquired by integrating the numbers of horizontal and vertical pixels.

The distortion correction unit 122 corrects the rotation and the distortion of a target such as a character or an object included in the input image so as to be transformed into an image acquired by capturing the target from the front side and outputs the transformed image.

Figure 6:
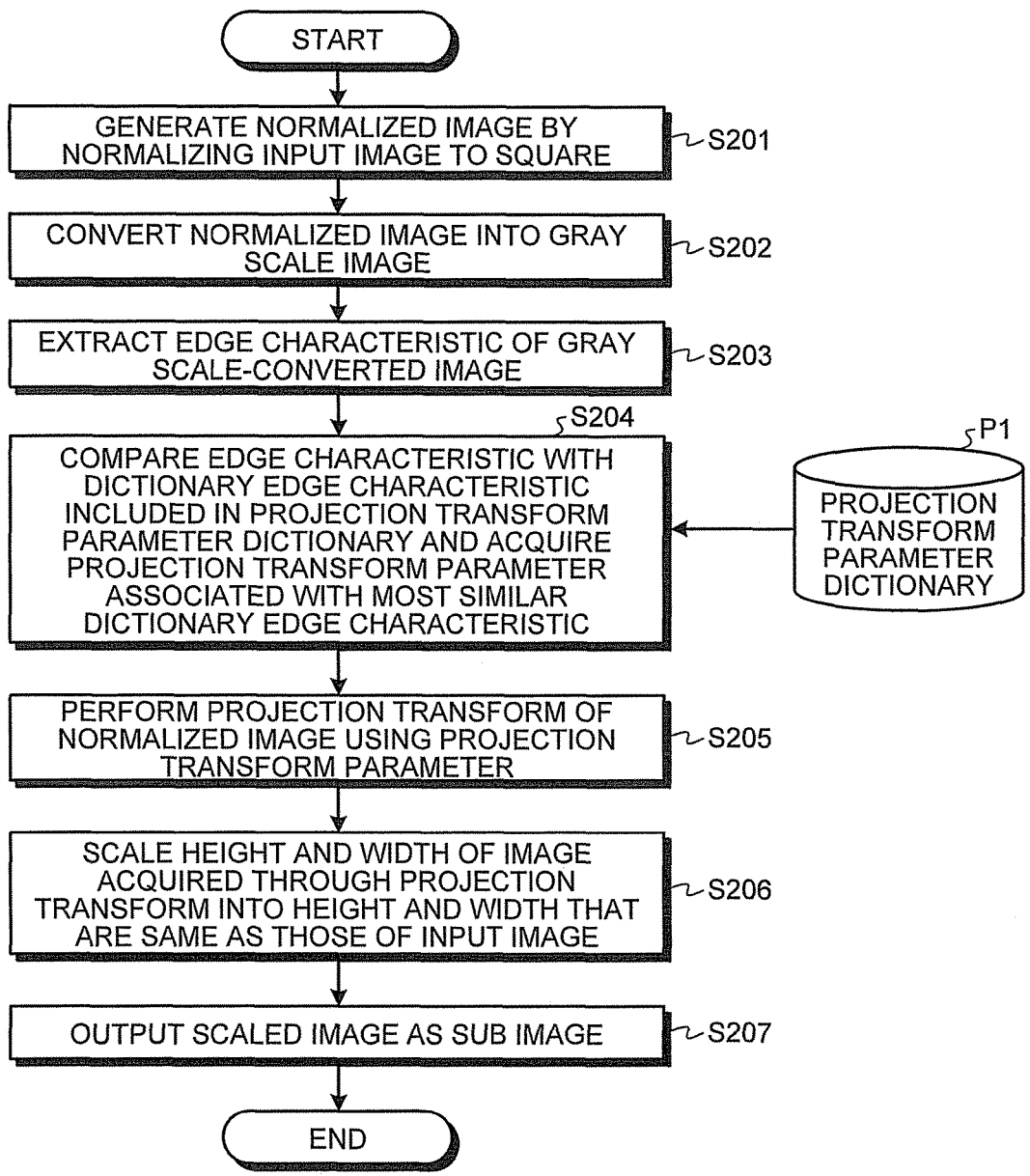
FIG. 6 is a flowchart that illustrates an example of the processing sequence of distortion correction unit.

FIG. 6 is a flowchart that illustrates an example of the processing sequence of the distortion correction unit 122. The distortion correction unit 122 performs the process of Steps S201 to S207 to be described below on an input image and outputs a sub image.

Step S201: The distortion correction unit 122 generates an image acquired by normalizing the input image to a square. Hereinafter, the image normalized as such will be referred as a normalized image.

Step S202: The distortion correction unit 122 converts the normalized image generated in Step S201 into a gray scale image. Here, in a case where the normalized image is an RGB color image, by setting an average value of R, G, and B of each pixel to a pixel value of the gray scale image, the conversion into the gray scale is performed. On the other hand, in a case where the normalized image is originally a gray scale image, each pixel value is set to a pixel value of the gray-scale converted image.

Step S203: The distortion correction unit 122 extracts an edge-based feature of the gray scale-converted image generated in Step S202. This edge-based feature is acquired by dividing the gray scale-converted image into blocks, calculating a sum of edge intensities in each block, and then binding the sums of the edge intensities of the respective blocks. The edge intensity can be calculated by using a known Sobel filter.

Step S204: The distortion correction unit 122 compares the edge-based feature extracted in Step S203 with a dictionary edge-based feature included in a projection transform parameter dictionary 91 and acquires a projection transform parameter that is associated with the most similar dictionary edge-based feature. Here, as a similarity measure between the edge-based feature and the dictionary edge-based feature, a cosine similarity is used.

In the projection transform parameter dictionary P1, one or more pairs of a dictionary edge-based feature and a projection transform parameter are stored. The dictionary edge-based feature and the projection transform parameter are generated in advance by using image data for instruction (training). As a method for performing a projection transform of an image or a method for calculating the projection transform parameter, a method is generally known in which the projection transform parameter can be calculated when the coordinates of four arbitrary points in an image and the coordinates of corresponding points acquired by performing a projection transform of the four points are given (see the following reference literature)

Reference literature: Computer Graphic Arts Society, "Digital Image Processing (first edition first printing), 2004, pages 163 to 164 and 171).

Step S205: The distortion correction unit 122 performs a projection transform of the normalized image by using the projection transform parameter that has been acquired in Step S204.

Step S206: The distortion correction unit 122 scales the height and the width of the image that has been acquired through the projection transform performed in Step S205 into a height and a width that are the same as those of the input image.

Step S207: The distortion correction unit 122 outputs the image scaled in Step S206 as a sub image.

The color correction unit 123 corrects the color of the image, for example, by cancelling the shading in the input image and outputs a resultant image as a sub image.

Figure 7:
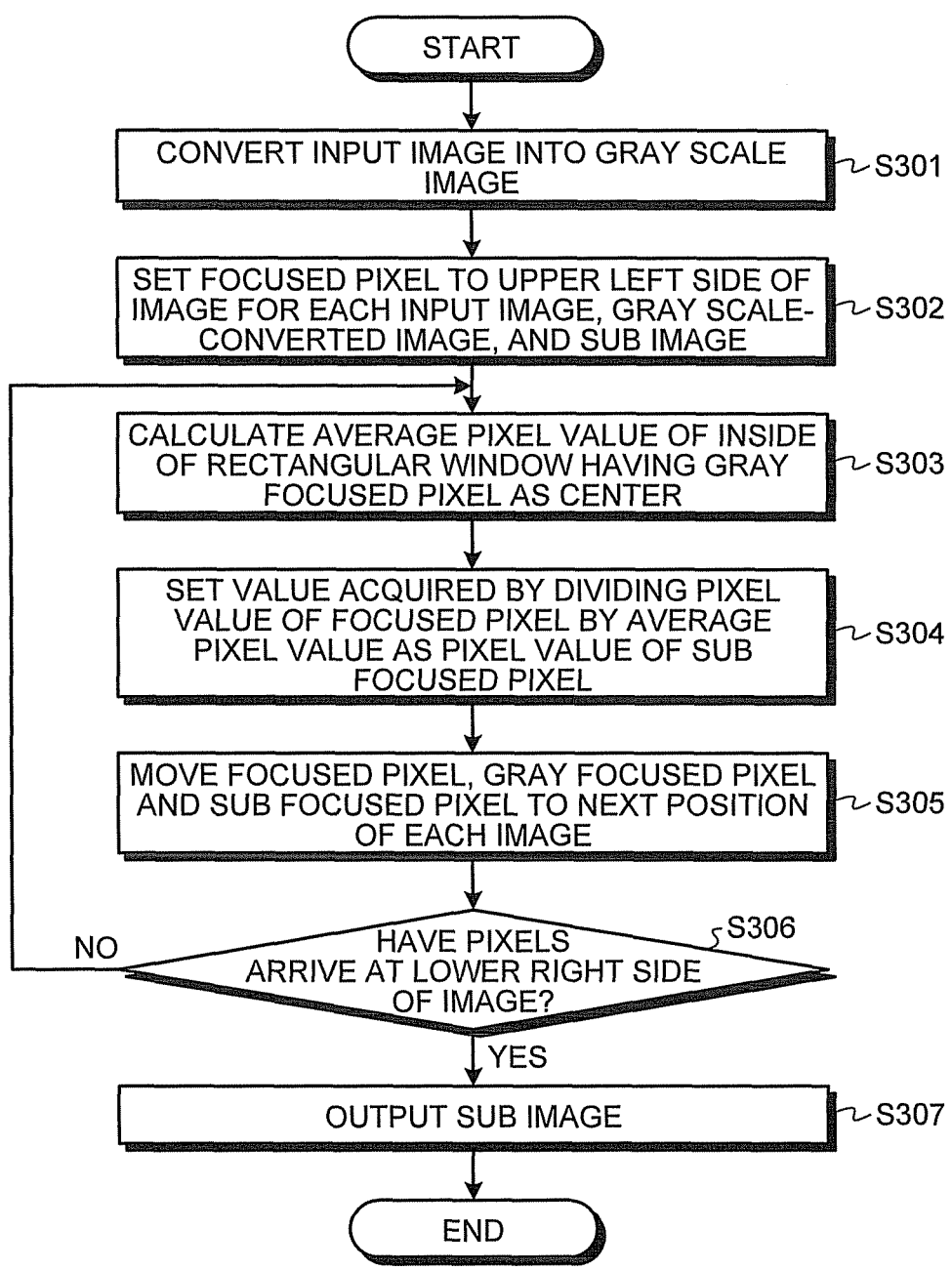
FIG. 7 is a flowchart that illustrates an example of the processing sequence of a color correction unit.

FIG. 7 is a flowchart that illustrates an example of the processing sequence of the color correction unit 123. The color correction unit 123 performs the process of Steps S301 to S307 to be described below for an input image and outputs a sub image.

Step S301: The color correction unit 123 converts the input image into a gray scale image. Here, in a case where the input image is an RGB color image, by setting an average value of R, G, and B of each pixel to a pixel value of the gray scale image, the conversion into the gray scale is performed. On the other hand, in a case where the input image is originally a gray scale image, each pixel value is set to a pixel value of the gray-scale converted image.

Step S302: The color correction unit 123 sets, for each of input image, the gray scale-converted image generated in Step S301 and the sub image to be output, a focused pixel to the upper left side of the image. Hereinafter, a focused pixel in the input image will be simply referred to as a focused pixel, a focused pixel in the gray scale-converted image will be referred to as a gray focused pixel, and a focused pixel in the sub image will be referred to as a sub focused pixel.

Step S303: The color correction unit 123 calculates an average pixel value of the inside of a rectangular window having the gray focused pixel as its center.

Step S304: The color correction unit 123 sets a value acquired by dividing the pixel value of the focused pixel by the average pixel value calculated in Step S303 as the pixel value of the sub focused pixel. At this time, in a case where the input image is an RGB color image, and the focused pixel has a pixel value for each a plurality of channels such as R, G, B, division using an average value of each channel is performed.

Step S305: The color correction unit 123 moves the focused pixel, the gray focused pixel, and the sub focused pixel to the next positions in the images.

Step S306: The color correction unit 123 determines whether or not each of the focused pixel, the gray focused pixel, and the sub focused pixel arrives at the lower right side of the image. Then, the process proceeds to Step S307 in a case where the result of the determination is "Yes", and the process is returned to Step S303 in a case where the result of the determination is "No".

Step S307: The color correction unit 123 outputs the sub image of which all the pixel values are set.

The sub-image proximity arrangement planner 130 is a module that determines the position of the sub image at the time of overlapping the sub image on the input image D1 by solving a mathematical model of arrangement plan optimization used for arranging the sub image in the proximity of the focused area that is the origin thereof. The sub-image proximity arrangement planner 130 receives the score-attached area image group D2 and the score-attached sub image group D3 as inputs, determines an optimal arrangement of each sub image included in the score-attached sub image group 03, and outputs an arrangement plan-attached sub image group D4 including the arrangement plan information.

FIG. 8 is a flowchart that illustrates an example of the processing sequence of the sub-image proximity arrangement planner 130. The sub-image proximity arrangement planner 130 acquires arrangement plan information of the sub image by performing the process of Steps S401 to S408 to be described below by using the score-attached area image group D2 and the score-attached sub image group D3 and outputs the arrangement plan-attached sub image group D4.

Step S401: The sub-image proximity arrangement planner 130, for examples, solves a proximity arrangement plan optimization model M1 illustrated in FIG. 9. The proximity arrangement plan optimization model M1 illustrated in FIG. 9 will be described later in detail.

Step S402: The sub-image proximity arrangement planner 130 determines whether or not a solution is acquired by the process performed in Step S401. Then, the process proceeds to Step S404 in a case where the result of the determination is "Yes", and the process proceeds to Step S403 in a case where the result of the determination is "No". In a case where any solution is not acquired, it represents that, under a restriction that each area image included in the score-attached area image group D2 and each sub image included in the score-attached sub image group D3 do not overlap each other, the sub images cannot be arranged in the proximity of the focused area that is the origin thereof. Thus, in a case where any solution is not acquired, a strategy of thinning out the sub images that are the arrangement targets is employed.

Step S403: The sub-image proximity arrangement planner 130 excludes a sub image having the lowest integral score among sub images included in the score-attached sub image group D3 from the targets for the arrangement and registers the sub image in a removal list buffer B3, and the process is returned to Step S401.

The sub-image proximity arrangement planner 130 acquires an optimal arrangement in a state in which some sub images included in the score-attached sub image group D3 are thinned out by repeating the process of Steps S401 to S403 described above. However, the arrangement acquired here is not necessarily be an optimal arrangement, and there is a possibility that the sub images are thinned out more than necessary. The reason for this is that, in Step S403, the sub images to be excluded from the targets for the arrangement are selected based on not the arrangement restriction but the integral score.

For example, in the detection result illustrated in FIG. 5, a case will be considered in which, when the integral score of the focused area (area image) including "小岩カメラ (KOIWA camera)" disposed on the upper left side is very low, and the integral score of the focused area (area image) including "分倍書店 本 (BUBAISHOTEN book)" disposed on the upper right side is high, a place at which the sub image of the focused area including "分倍書店 本" is not acquired, and a result of no solution is acquired. In such a case, a target to be thinned out with high priority is the sub image of the focused area including "小岩カメラ" having the low integral score. However, there is originally room in terms of the space on the periphery of the focused area including "小岩カメラ", and, even when the sub image is thinned out, it does not lead to the enhancement of the arrangement, thereby causing unnecessary thinning-out.

The reason for such a process is that, generally, while software called a solver to be described later is used for acquiring a solution of an optimization problem, in a case where any solution is not acquired by the solver, it is difficult to solve a problem of acquiring a set of minimal condition mitigation from among condition mitigation for which a solution can be acquired.

Thus, in the process of Step S404 and subsequent steps, it is determined whether or not a sub image that is the thing-out target can be arranged in the arrangement acquired until now. In a case where it is determined that the arrangement can be made, the arrangement is made as it is. Accordingly, a sub image that is an unnecessary thinning-out target, like the sub image of the focused area including "小岩カメラ" described above is revived to be arranged during such a process.

Step S404: The sub-image proximity arrangement planner 130 extracts sub images from the removal list buffer B3 in order of greatest to least integral score one at a time.

Step S405: The sub image proximity arrangement planner 130, under the restriction that an extracted sub image does not overlap with the other sub images or area images that are the origins of the other sub images, determines whether or not the extracted sub image can be arranged in the proximity of the focused area that is the origin of the sub image. The process proceeds to Step S406 in a case where the result of the determination is "Yes", and the process proceeds to Step S407 in a case where the result of the determination is "No".

Step S406: The sub image proximity arrangement planner 130 arranges the sub image determined to be arranged in Step S405 in the proximity of the focused area that is the origin of the sub image. In addition, actually, although the optimization problem is solved also in the process of Steps S405 and S406, detailed description thereof will not be presented here.

Step S407: The sub image proximity arrangement planner 130 determines whether or not all the sub images have been extracted from the removal list buffer B3. Then, the process proceeds to Step S408 in a case where the result of the determination is "Yes", and the process is returned to Step S404 in a case where the result of the determination is "No".

Step S408: The sub-image proximity arrangement planner 130 sets R'i (here, i=1, . . . , N) acquired as solutions as the arrangement plan information of the sub image and outputs the arrangement plan-attached sub image group D4.

Here, the numerical expression of the proximity arrangement plan optimization model M1 used in Step S401 described above will be described with reference to FIG. 9. FIG. 9 is a diagram that illustrates an example of the proximity arrangement plan optimization model M1.

In the proximity arrangement plan optimization model M1 illustrated in FIG. 9, the first row represents that a sum of distances between the focused area (area image) and corresponding sub images for all the sub images is minimized. The definition of the distance and a calculation method thereof will be described later with reference to FIG. 11.

In the proximity arrangement plan optimization model M1 illustrated in FIG. 9, the second row and subsequent rows represent restriction conditions. The third row applies a restriction, for the arrangement planned area of each sub image, that the closest focused area among all the focused areas is a focused area corresponding to the sub image. In other words, a sub image is required to be arranged so as to be closest to an area image corresponding to the focused area that is the origin of the sub image.

The fourth row applies a restriction that a distance between a sub image and a focused area (area image) that is the origin of the sub image is a predetermined distance or more. Accordingly, an advantage that an image is prevented from not being easily viewed due to the arranging of the sub image to be in contact with the focused area.

The fifth row applies a restriction that, in a set in which an area image group and a sub image group are combined, images of a same kind do not overlap each other. However, while description is not presented in the numerical expression for simplification, there is an exception for a case where area images overlap with each other due to the detection of focused areas to overlap each other from the start.

Figure 10:
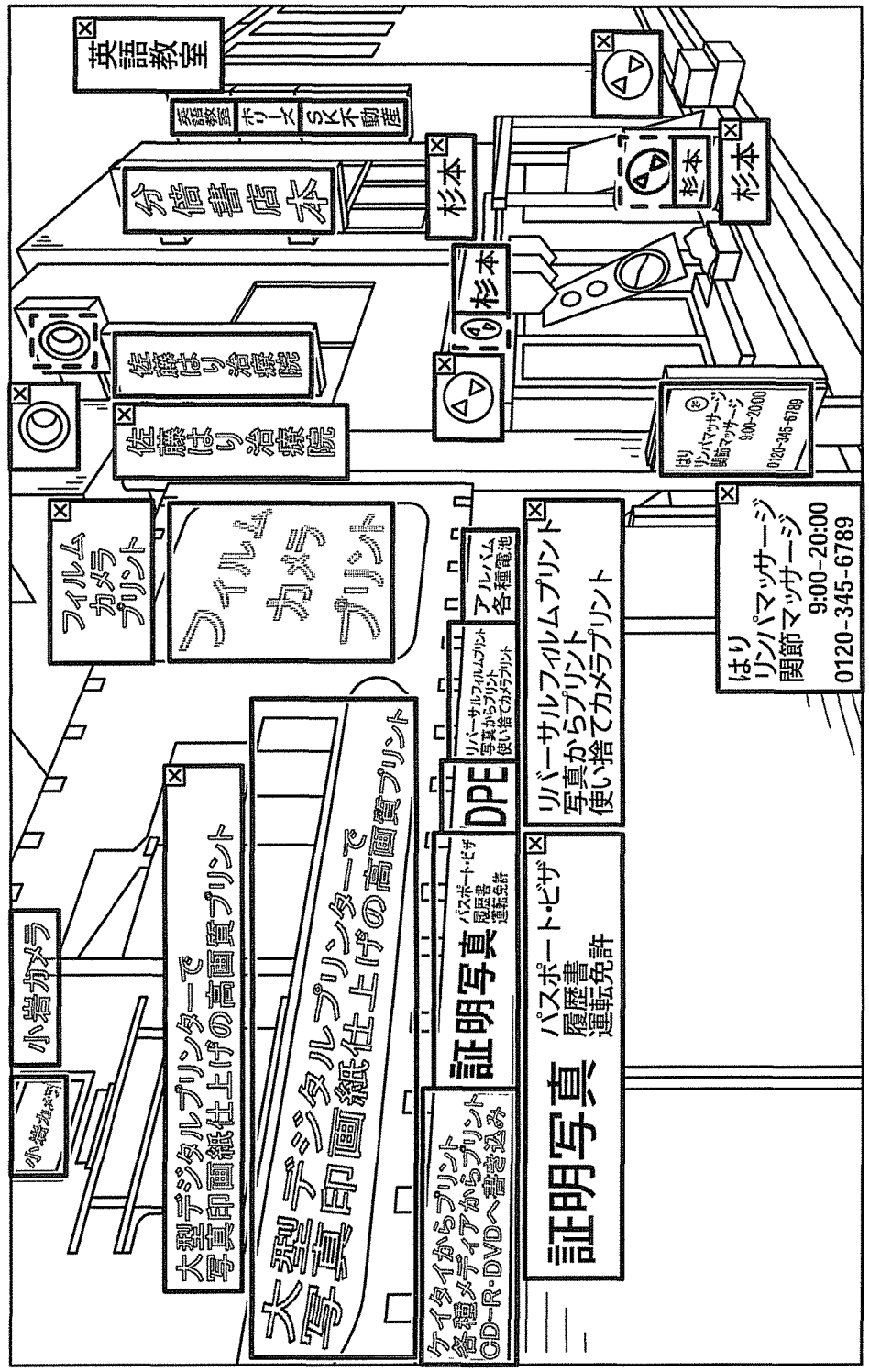
FIG. 10 is a diagram that illustrates an example of the arrangement of sub images according to the arrangement plan information acquired as a solution of a proximity arrangement plan optimization model in the example of the detection result illustrated in FIG. 5.

FIG. 10 is a diagram that illustrates an example of the arrangement of sub images according to the arrangement plan information acquired as a solution of the proximity arrangement plan optimization model M1 in the example of the detection result illustrated in FIG. 5. Each sub image is arranged to be closest to the focused area (area image) that is the origin of the sub image with a distance of a predetermined value or more being maintained therefrom, and all the sub images are arranged not to overlap with other sub images or focused areas (area image). However, in some areas, since this condition cannot be satisfied, the sub images are thinned out. For example, in a focused area including "ホリーズ (Hollies)" disposed on the upper right side in the figure or the like, a focused area including "不動産 (SK real estate", a focused area including "分倍書店 本", and the like, the sub images are thinned out.

Here, the proximity arrangement plan optimization model M1 illustrated in FIG. 9 is an example of the optimization model used by the sub-image proximity arrangement planner 130, and the optimization model is not limited thereto. For example, in the proximity arrangement plan optimization model M1 illustrated in FIG. 9, the upper limit of the number of sub images to be arranged may be inserted. Accordingly, inconvenience that images cannot be easily viewed due to an increase in the display number of sub images can be resolved.

As one method for acquiring a solution of the optimization model using a computer, there is a method in which software called a solver is used. The solver is software that calculates a solution when a mathematical model of optimization is input in a text form or the like, and various kinds of software including free software lpsolve have been released. In this embodiment, the solution of the proximity arrangement plan optimization model M1 is acquired by using the solver.

FIG. 11 is a diagram for explaining a method of calculating a distance between a focused area (area image) and a corresponding sub image. The distance between the focused area (area image) and the sub image is acquired as a distance between rectangles. While the distance between rectangles may be considered in various manners, in this embodiment, the following definition is used.

For rectangle A and rectangle B, when XA is an arbitrary point on the outer periphery of rectangle A, and XB is an arbitrary point on the outer periphery of rectangle B, a distance D(A, B) between rectangle A and rectangle B is represented in the following Equation (1).

$$D(A,B)=\min(XA,XB) \quad (1)$$

A method of measuring a distance between rectangles according to the above-described definition using a computer will be briefly described as below. First, it is determined whether the case is a case where two rectangles are vertically aligned (Case 1) as illustrated in part (a) in FIG. 11 or a case where two rectangles are horizontally aligned (Case 2) as illustrated in part (b) in FIG. 11. Then, in the case of Case 1, a distance d1 illustrated in part (a) in FIG. 11 is measured as the distance between the rectangles, and, in the case of Case 2, a distance d2 illustrated in part (b) in FIG. 11 is measured as the distance between the rectangles. In addition, a distance between the rectangles may be measured using a plurality of distance indices. In such a case, it is necessary to integrate the values of the plurality of indices as one scalar. As the method, a method of taking a linear sum, a method of employing a minimum value among the plurality of indices, or the like may be considered.

The arrangement plan-attached sub image group D4 generated as above is output to both a sub-image display control unit 151 of the display control unit 150 and the recognition unit 140 to be described later. Then, a process of immediately displaying a sub image on the display device 160 based on the arrangement plan information using the sub-image display control unit 151 and a process of recognizing targets (targets included in the focused area) such as characters and logo marks included in the sub image using the recognition unit 140 are performed in a parallel manner. While a result of the recognition performed by the recognition unit 140 is displayed on the display device 160 by a recognition result display control unit 152 of the display control unit 150 to be described later, the display of the result of the recognition is performed through the recognition process performed by the recognition unit 140 and, accordingly, the display of the result is delayed by one tempo from the display of the sub image. Accordingly, for the eyes of a user, a screen effect in which a sub image is displayed first on the display device 160, and then a result of the recognition is displayed with a delay is applied. In this way, there is an advantage that a sub image achieves the role of a preview forming a cognitive connection until a result of the recognition is displayed on the display device 160 and the like.

The recognition unit 140 receives the arrangement plan-attached sub image group D4 as an input, performs a recognition process of targets included in sub images each having an integral score of a second threshold or more among the sub images included in the arrangement plan-attached sub image group D4, in other words, targets included in focused areas that are origins of the sub images each having an integral score of the second threshold or more, and outputs a recognition result D5. Here, the second threshold is a value different from the first threshold used as the threshold of the local score output by the binary classifier in the object detector 111 or the character area detector 112 of the detection unit 110 and is set to a value (large value) that is more intense than the first threshold.

In this embodiment, a logo mark and a character are set as the targets for the recognition performed by the recognition unit 140. The input arrangement plan-attached sub image group D4 is classified into a sub image of a logo mark and a sub image of a character, and the recognition process is performed on the former by an object recognition unit 141 that is a sub module, and the recognition process is performed on the latter by a character recognition unit 142.

The object recognition unit 141 discriminates the logo mark included in the sub image from among logo marks registered in advance and outputs a word that represents a logo mark name as a result of the recognition. In the recognition process of a logo mark, a known technology may be used.

The character recognition unit 142 discriminates a text (characters) formed by one row to a plurality of rows included in the sub image and outputs the text as a result of the recognition. In the recognition process of characters, a known technology may be used. For example, a method is known in which an image (sub image) is binarized, an individual character area is specified, and an individual character is recognized, and such a method may be applied.

In this embodiment, either in a case where the recognition process of a logo mark is performed using the object recognition unit 141 or in a case where the character recognition is performed using the character recognition unit 142, the recognition result D5 that is output is assumed to be a text.

Both the object recognition unit 141 and the character recognition unit 142 of the recognition unit 140 use a multi-class discriminative model that is trained by the recognition unit trainer 300. Accordingly, it is necessary to generate the multi-class discriminative model by operating the recognition unit trainer 300 once before the use of the main system 100.

This multi-class discriminative model is prepared for each category of the recognition target such as a discriminative model of a logo mark, a discriminative model of characters, and the like. The multi-class discriminative model is trained by the recognition unit trainer 300 using a positive-example image group 310 and a negative-example image group 320. The positive-example image group 310 is an image group in which a target of a corresponding category is included, and the negative-example image group 320 is an image group in which a target of a corresponding category is not included. By using these as a positive example and a negative example, the discriminative model of the multi-class classifier such as a multi-class SVM is trained.

The display control unit 150 displays each sub image included in the arrangement plan-attached sub image group D4 and the recognition result D5 acquired through the recognition process performed by the recognition unit 140 on the display device 160, for example, in a form that overlaps with the input image D1. The display of a sub image is started when the display control unit 150 acquires the arrangement plan-attached sub image group D4 from the sub-image proximity arrangement planner 130. Meanwhile, the display of the recognition result D5 is started when the display control unit 150 acquires the recognition result D5 from the recognition unit 140. Both the processes are performed in an asynchronous manner. However, the timing at which the recognition result D5 arrives is delayed by a time required for the recognition process performed by the recognition unit 140 from the timing at which the arrangement plan-attached sub image group D4 arrives. Accordingly, as a result, on the display device 160, after the sub image is displayed, the recognition result D5 is displayed.

In addition, the display control unit 150 performs UI (User Interface) control such as reception of an operation performed by the user on the image displayed on the display device 160. Here, as the display device 160, various display devices, for example, a liquid crystal display panel and the like may be used. In addition, as an operation device used by the user for the operation for the image, various operation devices such as a touch panel configured to be integrated with the display device 160 and the like may be used in addition to a mouse and a keyboard. The display control of a sub image, the display control of the recognition result D5, and the UI control are individually performed by three sub modules including the sub-image display control unit 151, the recognition result display control unit 152, and a UI control unit 153, respectively.

The sub-image display control unit 151 displays each sub image included in the arrangement plan-attached sub image group D4 on the display device 160, for example, in a display form overlapping the input image D1 in a form that accompanies a screen representation representing a correspondence relation with the focused area (area image) disposed inside the input image D1 based on the arrangement plan information described above.

Figure 12:
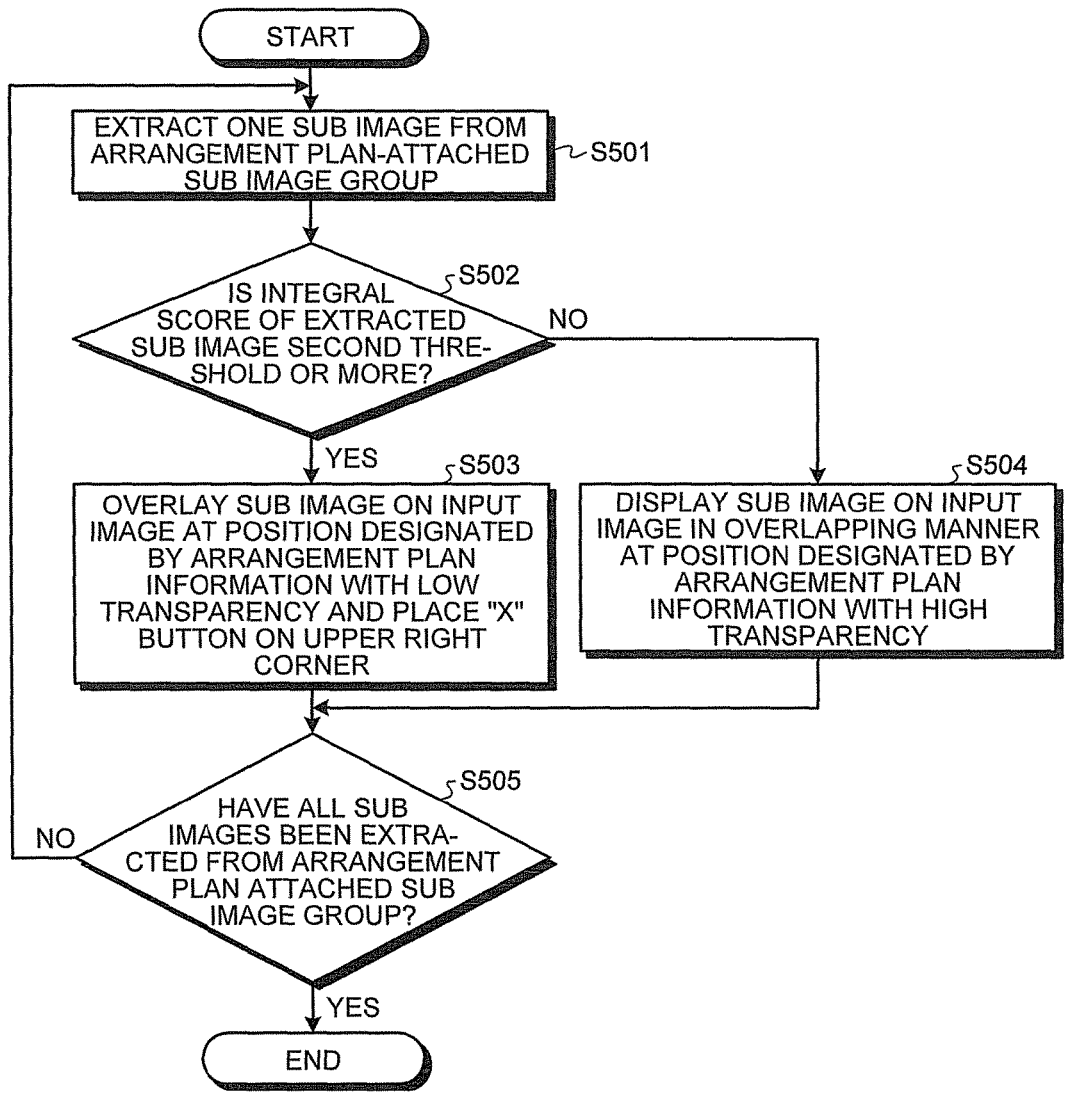
FIG. 12 is a flowchart that illustrates an example of the processing sequence of a sub-image display control unit.

FIG. 12 is a flowchart that illustrates an example of the processing sequence of the sub-image display control unit 151. The sub-image display control unit 151 performs the process of Steps S501 to S505 to be described below by using the input image D1 and the arrangement plan-attached sub image group D4, thereby displaying the input image D1 with which the sub image overlaps on the display device 160.

Step S501: The sub-image display control unit 151 extracts one sub image from the arrangement plan-attached sub image group D4.

Step S502: The sub-image display control unit 151 determines whether or not the integral score of the sub image extracted in Step S501 is the second threshold or more. The process proceeds to Step S503 in a case where the result of the determination is "Yes", and the process proceeds to Step S504 in a case where the result of the determination is "No". Here, the second threshold used is the same as the threshold used when it is determined whether the recognition process is to be performed by the recognition unit 140. In other words, the sub-image display control unit 151, in Step S502, determines whether the sub image extracted in Step S501 is a sub image (first sub image) on which the recognition process is to be performed by the recognition unit 140 or a sub image (second sub image) on which the recognition process performed by the recognition unit 140 is not to be performed.

Step S503: The sub-image display control unit 151 overlays the sub image (first sub image) extracted in Step S501 on the input image D1 at a position designated by the arrangement plan information with low transparency (such that the input image D1 disposed below is not seen through the sub image). In addition, at this time, the sub-image display control unit 151 places an "X" button on the upper right side of the sub image. This "X" button is used as a UI that is used for receiving an operation for excluding a target included in the sub image from the recognition process from the user.

Step S504: The sub-image display control unit 151 overlays the sub image (second sub image) extracted in Step S501 on the input image D1 at a position designated by the arrangement plan information with high transparency (such that the input image D1 disposed below is seen through the sub image). The display area of this sub image is used as a UI that is used for receiving an operation of adding a target included in the sub image as the target for the recognition process from the user.

Step S505: The sub-image display control unit 151 determines whether or not all sub images have been extracted from the arrangement plan-attached sub image group D4. Then, the process is returned to Step S501 in a case where the result of the determination is "No", and the process ends in a case where the result of the determination is "Yes".

As a result of the above-described process performed by the sub-image display control unit 151, on the display device 160, as illustrated in FIG. 10, each sub image included in the arrangement plan-attached sub image group D4 is overlaid on the input image D1. In addition, in this embodiment, while a screen representation in which a sub image is arranged in the proximity of the focused area (area image) is used as a screen representation that represents the correspondence relation between the sub image and the focused area (area image) disposed inside the input image D1 is used, the screen representation is not limited thereto. For example, in order to clearly represent the correspondence relation between the sub image and the focused area (area image) disposed inside the input image D1, a screen representation such as a lead-out line may be additionally used in the proximity arrangement or be independently used therein.

The recognition result display control unit 152 displays a recognition result D5 output by the object recognition unit 141 or the character recognition unit 142 of the recognition unit 140 on the display device 160, for example, in a display form overlapping with the input image D1 in a format that accompanies a screen representation representing the correspondence relation with a corresponding sub image.

In this embodiment, as the screen representation that represents the correspondence relation between the recognition result D5 and the sub image, a screen representation in which the recognition result D5 is arranged to partly overlap a corresponding sub image is used. In other words, a position offset in accordance with the size of the sub image with respect to the position of each sub image designated by the arrangement plan information is set as the arrangement position of the recognition result D5. The screen representation that represents the correspondence relation between the recognition result D5 and the sub image is not limited to this example, and various screen representations such as a screen representation using the above-described lead-out line may be used.

Figure 13:
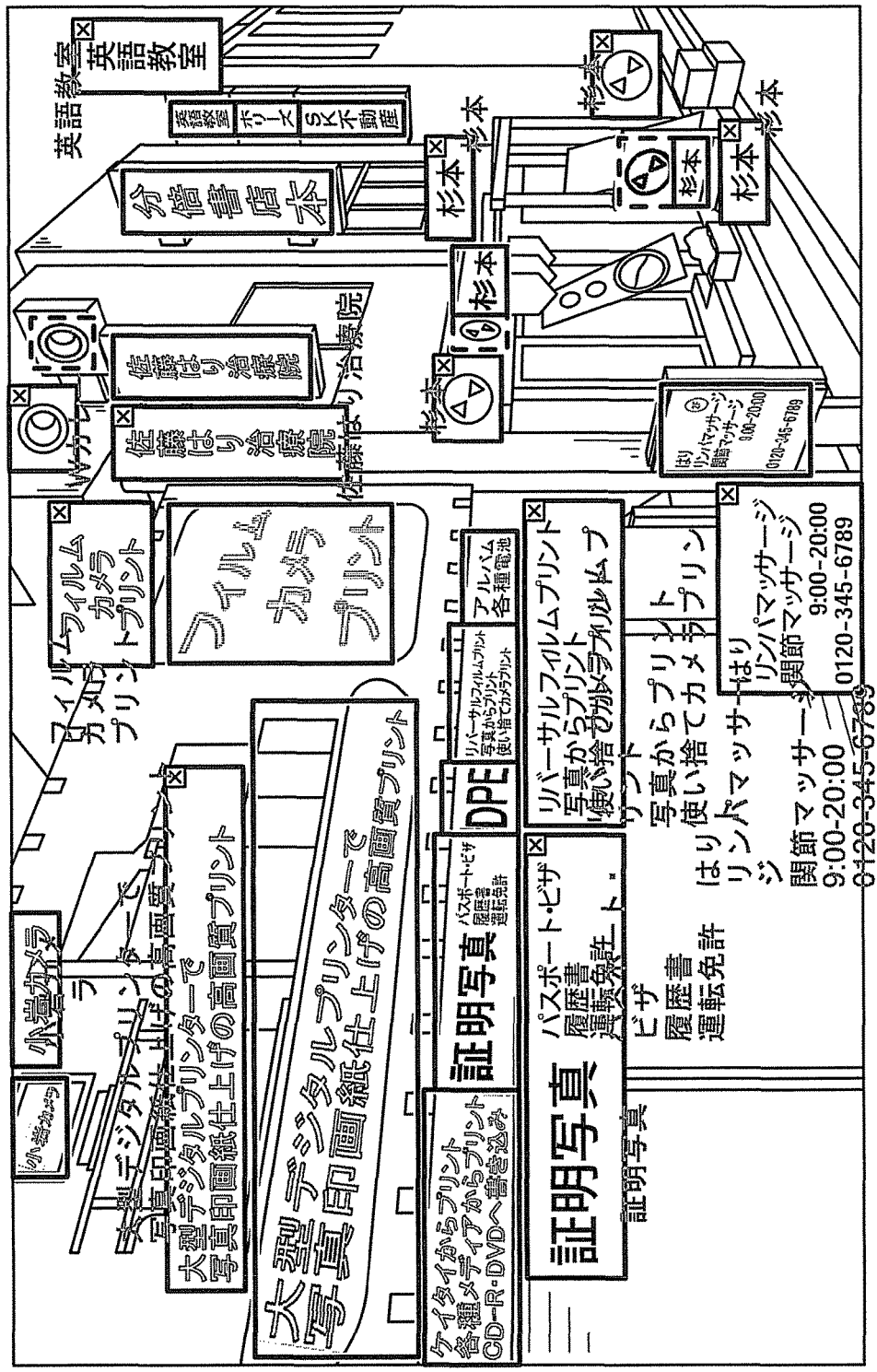
FIG. 13 is a diagram that illustrates an example of an image displayed on a display device as a result of the process performed by a recognition result display control unit.

FIG. 13 is a diagram that illustrates an example of an image displayed on the display device 160 as a result of the process performed by the recognition result display control unit 152. The example of the image illustrated in FIG. 13 represents an example in which the recognition result D5 is additionally displayed on the image illustrated in FIG. 10. On the display device 160, after the image illustrated in FIG. 10 is displayed, in a step in which the recognition process performed by the recognition unit 140 ends, the image illustrated in FIG. 13 is displayed.

In the display of the image that is performed by the display device 160, as described above, a best arrangement is made according to an algorithm of the sub-image proximity arrangement planner 130 with the restriction being satisfied. However, in a case where the restriction cannot be satisfied without any change, the display of a sub image having a low integral score is given up, whereby the restriction is satisfied. Accordingly, there are cases where, since sub images are densely arranged, all the sub images cannot be arranged, and a local area in which sub images are thinned out occurs. For example, in the example of the image illustrated in FIG. 10 or FIG. 13, an upper right area of the image corresponds to this, and the sub image of the focused area including "ホリーズ", the sub image of the focused area including "SK不動産", and the sub image of the focused area including "分倍書店 本*" are not displayed in accordance with the thinning-out process.

On the other hand, a local area in which, since sub images are sparsely arranged, up to a sub image having a low integral score that is below the second threshold is displayed may occur. For example, in the example of the image illustrated in FIG. 10 or FIG. 13, an upper left area of the image corresponds to this, and since there is room in the space, a sub image of the focused area including "小岩カメラ," of which the integral score is below the second threshold is displayed as well.

The UI control unit 153 performs UI control such as receiving a user's operation performed for the image displayed on the display device 160. In this embodiment, two operations relating to a feedback to the sub image displayed in accordance with a user's operation for the image displayed on the display device 160 and one operation relating to a feedback to an undetected area are handled. Hereinafter, the process of the UI control unit 153 for each operation will be described.

A sub image (the first sub image that is the target for the recognition process) of which the integral score is the second threshold or more, as described above, is displayed in a state in which the X" button is added to the upper right side of the image. Then, when the user performs an operation of pressing the X" button, a feedback can be applied to the sub image so as to be reanalyzed as a sub image of which the integral score is below the second threshold. Accordingly, incorrect detection of an area that is performed by the detection unit 110 can be corrected. Hereinafter, this process will be referred to as a false-positive incorrect detection correction.

Figure 14:
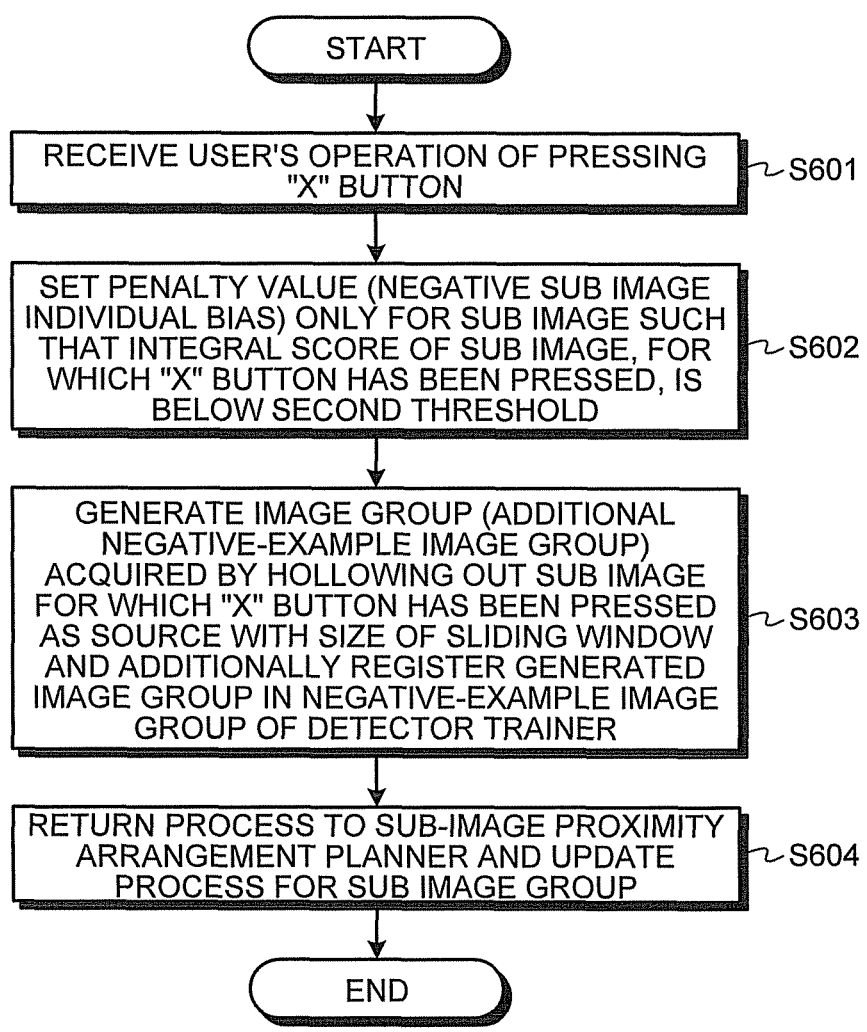
FIG. 14 is a flowchart that illustrates an example of the processing sequence of a false-positive incorrect detection correction.

FIG. 14 is a flowchart that illustrates an example of the processing sequence of the false-positive incorrect detection correction. When the user performs an operation of pressing the "X" button disposed on the upper right side of the sub image displayed on the display device 160, the UI control unit 153 performs the process of Steps S601 to S604 described below, thereby updating the display of the display device 160.

Step S601: The UI control unit 153 receives a user's operation of pressing the "X" button disposed on the upper right side of the sub image displayed on the display device 160.

Step S602: The UI control unit 153 sets a penalty value (sub-image individual penalty D6) only for a sub image for which the "X" button has been pressed such that the integral score of the sub image is below the second threshold. This sub-image individual penalty D6 is transmitted to the sub-image proximity arrangement planner 130 and is used for correcting the integral score of the sub image.

Step S603: The UI control unit 153 generates an image group (additional negative-example image group D7) acquired by hollowing out the sub image, for which the "X" button has been pressed, with the size of the sliding window and additionally registers the generated image group in the negative-example image group 220 of the detection unit trainer 200. Then, the UI control unit 153 instructs the detection unit trainer 200 to retrain the detection unit, thereby causing the detection unit trainer 200 to retrain the detection unit 110. The result of this retraining is reflected when the main system 100 is used next time and after that.

Step S604: The UI control unit 153 returns the process to the sub-image proximity arrangement planner 130 and updates the process for the sub image for which the "X" button has been pressed. Accordingly, the sub image for which the "X" button has been pressed has the integral score being corrected based on the sub-image individual penalty D6 and is handled as a sub image of which the integral score is below the second threshold. As a result, the sub-image display control unit 151 updates the display of the sub image that is performed by the display device 160 and redraws the sub image as an image having high transparency on the input image D1. In addition, the recognition result display control unit 152 stops the display of the recognition result relating to the sub image displayed until then.

A sub image of which the integral score is below the second threshold, as described above, is overlaid on the input image D1 with high transparency (such that the input image D1 disposed below is seen through the sub image). Then, when the user performs an operation of designating a display area of the sub image displayed as such, for example, by using a method of clicking the display area with a mouse, a feedback can be applied to the sub image so as to be reanalyzed as a sub image of which the integral score is the second threshold or more. Accordingly, incorrect detection of the area that is performed by the detection unit 110 can be corrected. Hereinafter, this process will be referred to as a false-negative incorrect detection correction.

Figure 15:
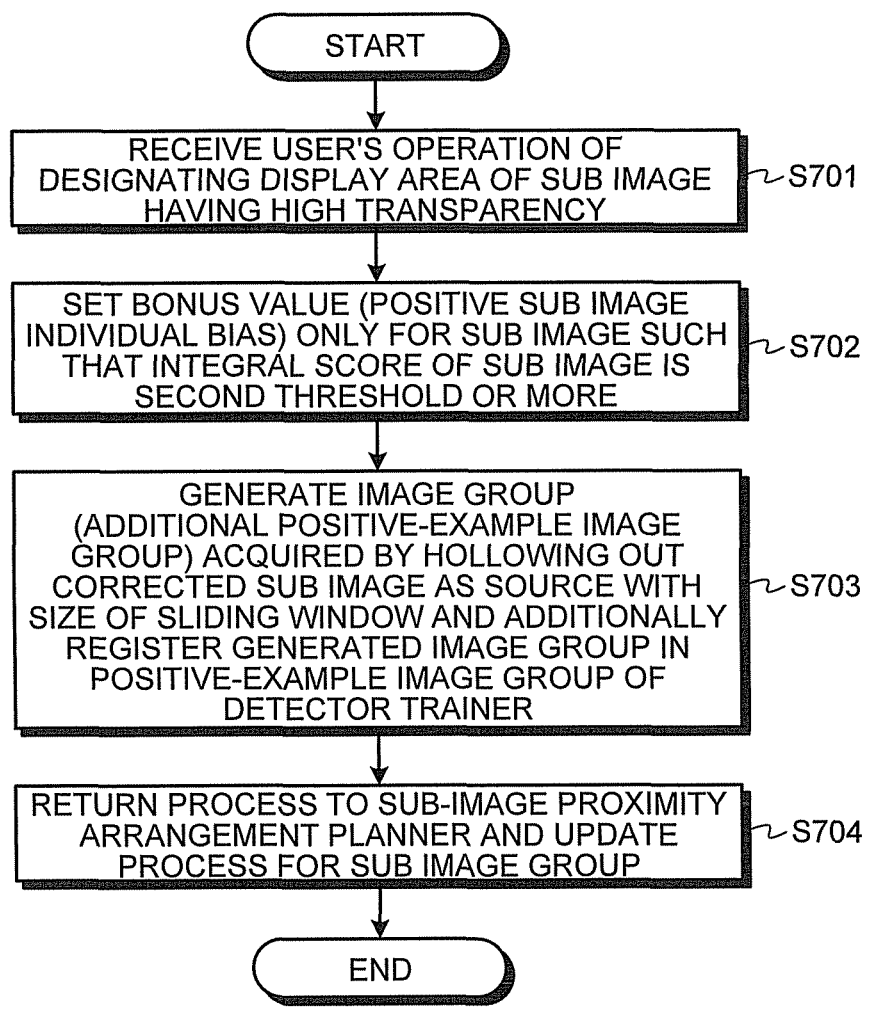
FIG. 15 is a flowchart that illustrates an example of the processing sequence of a false-negative incorrect detection correction.

FIG. 15 is a flowchart that illustrates an example of the processing sequence of the false-negative incorrect detection correction. When the user performs an operation of designating the area of the sub image that is displayed on the display device 160 with high transparency, the UI control unit 153 performs the process of Steps S701 to S704 described below, thereby updating the display of the display device 160.

Step S701: The UI control unit 153 receives a user's operation of designating the area of the sub image that is displayed on the display device 160 with high transparency.

Step S702: The UI control unit 153 sets a bonus value (sub-image individual bonus D8) only for the sub image such that the integral score of the sub image is the second threshold or more. This sub-image individual bonus D8 is transmitted to the sub-image proximity arrangement planner 130 and is used for correcting the integral score of the sub image.

Step S703: The UI control unit 153 generates an image group (additional positive-example image group D9) acquired by hollowing out the sub image with the size of the sliding window and additionally registers the generated image group in the positive-example image group 210 of the detection unit trainer 200. Then, the UI control unit 153 instructs the detection unit trainer 200 to retrain the detection unit, thereby causing the detection unit trainer 200 to retrain the detection unit 110. The result of this retraining is reflected when the main system 100 is used next time and after that.

Step S704: The UI control unit 153 returns the process to the sub-image proximity arrangement planner 130 and updates the process for the sub image. Accordingly, the sub image has the integral score being corrected based on the sub-image individual bonus D8 and is handled as a sub image of which the integral score is the second threshold or more. As a result, the sub-image display control unit 151 updates the display of the sub image that is performed by the display device 160 and redraws the sub image as an image, to which the "X" button is added on the upper right side, having low transparency on the input image D1. In addition, the recognition unit 140 performs the recognition process of a target included in the sub image, and a recognition result D5 is additionally displayed on the display device 160 by the recognition result display control unit 152.

In addition, a case may be considered in which a focused area to be regarded as the recognition target for the recognition unit 140 has not been detected by the detection unit 110, and, as a result, the sub image of the area is not displayed on the display device 160. In such a case, when the user performs an operation of designating the position of the undetected area, for example, by pressing the mouse button near the area for a predetermined time, a feedback may be applied such that the peripheral area including the position designated by the user can be easily detected by the detection unit 110. Accordingly, also for an area in which the sub image is not displayed, the incorrect detection of the area that is performed by the detection unit 110 can be corrected. Hereinafter, this process will be referred to as correction of undetected areas.

Figure 16:
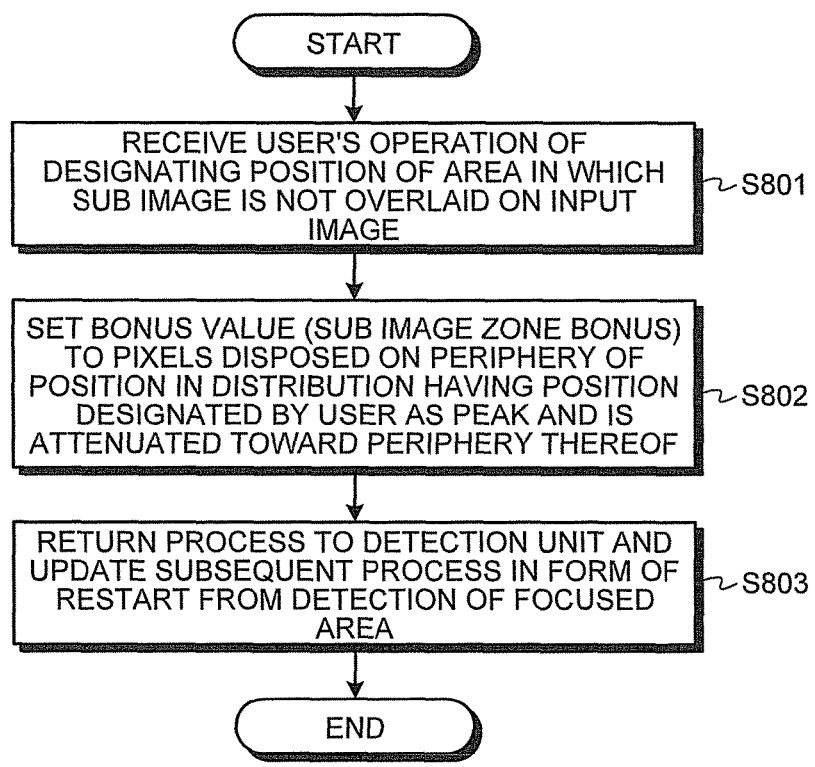
FIG. 16 is a flowchart that illustrates an example of the processing sequence of correction of undetected areas.

FIG. 16 is a flowchart that illustrates an example of the processing sequence of the correction of undetected areas. When an operation of designating the position of an area in which the sub image is not overlaid is performed on the input image D1 displayed on the display device 160, the UI control unit 153 performs the process of Steps S801 to S803 described below, thereby updating the display of the display device 160.

Step S801: The UI control unit 153 receives a user's operation of designating the position of an area in which the sub image is not overlaid on the input image D1 displayed on the display device 160.

Step S802: The UI control unit 153 sets bonus values (sub image zone bonuses D10) to pixels disposed on the periphery of the position in such a distribution to have the position designated by the user on the input image D1 as the peak and is attenuated toward the periphery thereof.

Figure 17:
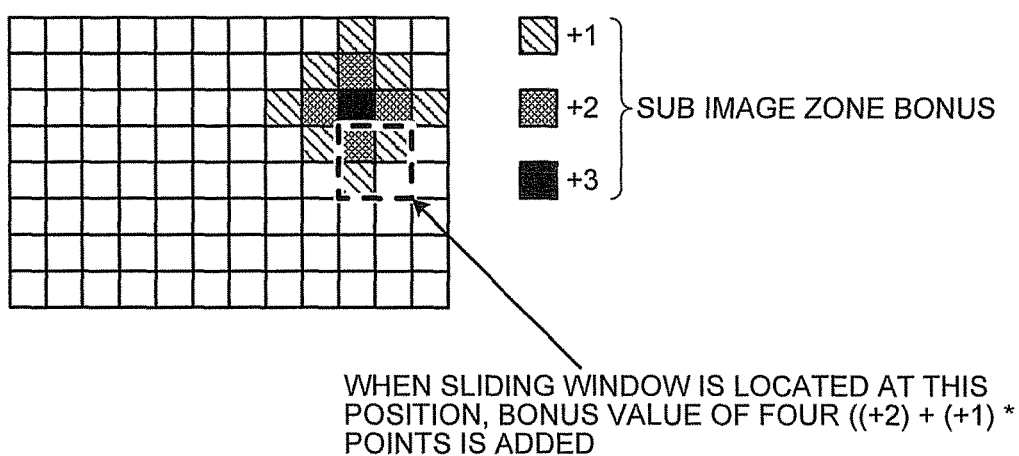
FIG. 17 is a diagram that illustrates a sub image zone bonus.

FIG. 17 is a diagram that illustrates the sub image zone bonus D10. In the example illustrated in FIG. 17, a blackened rectangle represents the position on the input image D1 that has been designated by the user, a periphery of the position is represented by cross-hatched rectangles, and a further periphery thereof is represented by hatched rectangles. In this case, the UI control unit 153, for example, sets sub image zone bonuses of +3 to the position of the blackened rectangle, +2 to the positions of the cross-hatched rectangles, and +1 to the positions of the hatched rectangles. Here, for example, in a case where the size of the sliding window used for the detection of a focused area by the detection unit 110 is size corresponding to four rectangles illustrated in FIG. 17, when the sliding window is located at a position denoted by broken lines illustrated in FIG. 17, a bonus value of a total of four points is added to the local score of the area enclosed by the sliding window. Here, while the bonus value is represented as an integer, in a case where the local score is represented to be a value of one or less, the bonus value has a value of a fraction.

Step S803: The UI control unit 153 returns the process to the detection unit 110 and updates the subsequent process in the form of restart from the detection of a focused area using the detection unit 110. The detection unit 110 that is called in accordance with the returning of the process needs to perform the process corresponding to the sub image zone bonus D10. More specifically, the process of adding bonus values to the local scores calculated by the binary classifier, as illustrated in FIG. 17, is performed. As a result, the periphery area of the position designated by the user on the input image D1 is newly detected as a focused area, and the display of the sub image and the recognition result D5 on the input image D1 displayed on the display device 160 is updated.

As described above in detail with reference to the specific example, according to the image display apparatus of this embodiment, the detection unit 110 detects a focused area from the input image D1, and the generation unit 120 generates a sub image by performing correction for improving the visibility on the image (image area) of the detected focused area. Then, the sub-image proximity arrangement planner 130 determines the arrangement plan of the generated sub images, and the display control unit 150 displays the sub images on the display device 160 so as to overlap the input image D1 such that the correspondence relation with the focused area (area image) disposed inside the input image D1 can be known in accordance with the determined arrangement plan. In addition, when the recognition unit 140 performs the recognition process of sub images of which the integral scores are the second threshold or more, and the recognition process ends, the display control unit 150 displays the recognition result D5 on the display device 160 so as to further overlap the input image D1 such that the correspondence relation with the sub image can be known.

In addition, according to the image display apparatus of this embodiment, a sub image on which the recognition process has been performed by the recognition unit 140 and a sub image on which the recognition process has not been performed by the recognition unit 140 are displayed on the display device 160 in mutually-different display forms, and a user's operation for the displayed sub image is received, whereby a feedback reflecting the user's intention is made for the detection of a focused area that is performed by the detection unit 110.

Therefore, according to the image display apparatus of this embodiment, an image display according to the recognition of a scene image having a high level of convenience, which achieves all the recovery function [A1] for incorrect recognition, the recovery function [A2] for incorrect detection of a focused area, the function [B] for supplementing the deterioration in the responsiveness according to the recognition process, the function [C] for leading appropriate observation, and the function [D] for supporting the reading of a focused area described above, can be provided.

Second Embodiment

Next, an image display apparatus according to a second embodiment will be described. While the image display apparatus according to the second embodiment has almost the same functions as the above-described image display apparatus according to the first embodiment, a method of displaying a sub image and a recognition result is different from that of the first embodiment. Hereinafter, the same reference sign will be assigned to the same constituent element as that of the image display apparatus of the first embodiment, duplicate description thereof will not be presented, and only characteristic parts of this embodiment will be described.

Figure 18:
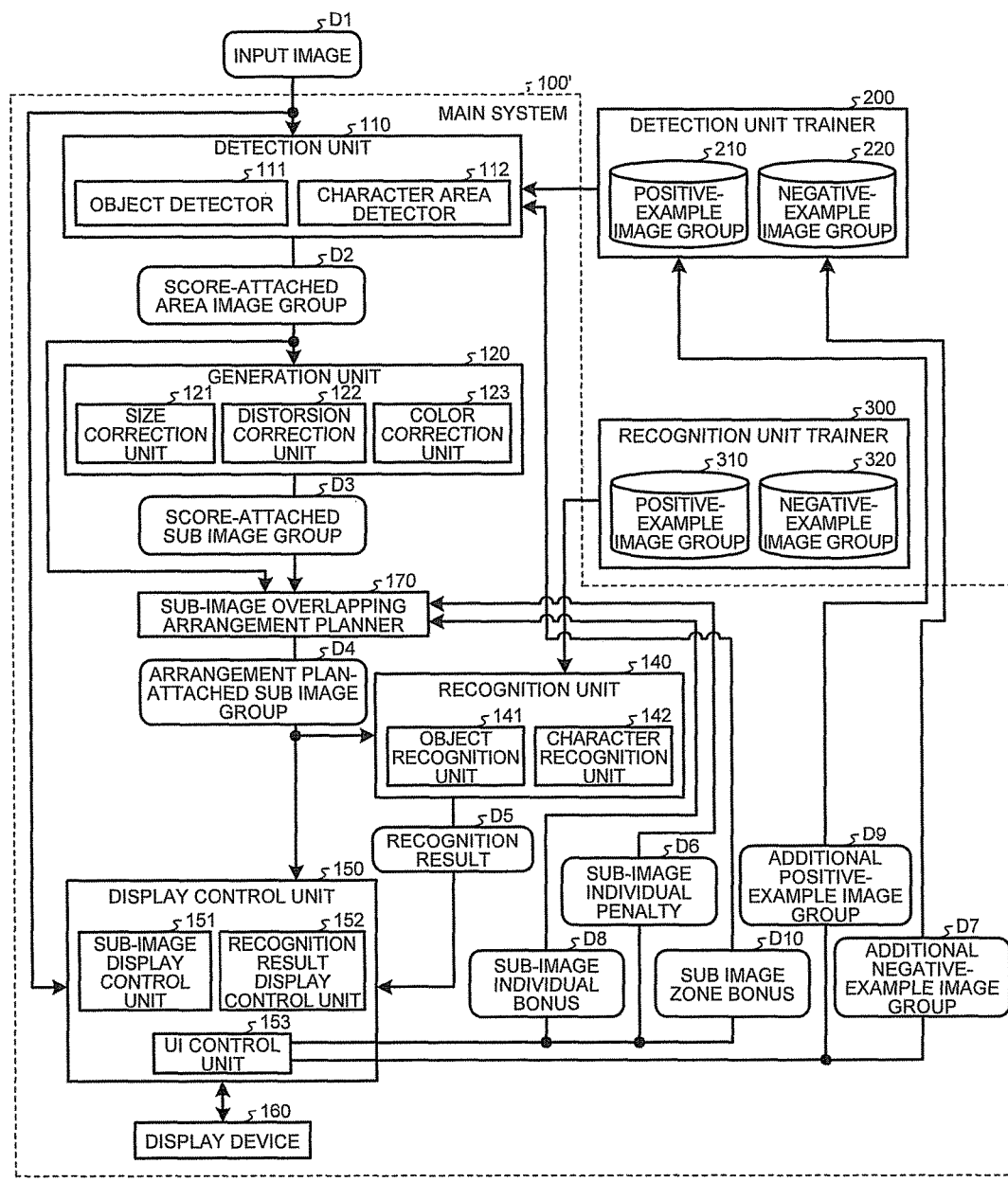
FIG. 18 is a block diagram that illustrates an example of the configuration of an image display apparatus according to a second embodiment.

FIG. 18 is a block diagram that illustrates an example of the configuration of the image display apparatus according to the second embodiment. In the image display apparatus of the second embodiment, as illustrated in FIG. 18, instead of the sub-image proximity arrangement planner 130 disposed in the main system 100 of the image display apparatus according to the first embodiment, a sub-image overlapping arrangement planner 170 is disposed in a main system 100'. The other configurations of the image display apparatus according to the second embodiment are the same as those of the image display apparatus according to the first embodiment.

The sub-image overlapping arrangement planner 170 is a module that determines the position of a sub image at the time of overlapping the sub image on the input image D1 by solving a mathematical model of arrangement plan optimization used for arranging the sub image to overlap a focused area that is the origin of the sub image. The sub-image overlapping arrangement planner 170 receives the score-attached area image group D2 and the score-attached sub image group D3 as inputs, determines an optimal arrangement of each sub image included in the score-attached sub image group D3, and outputs the arrangement plan-attached sub image group D4 including the arrangement plan information.

FIG. 19 is a flowchart that illustrates an example of the processing sequence of the sub-image overlapping arrangement planner 170. The sub-image overlapping arrangement planner 170 acquires arrangement plan information of a sub image by performing the process of Steps S901 to S908 described below by using the score-attached area image group D2 and the score-attached sub image group D3 and outputs the arrangement plan-attached sub image group D4.

Step S901: The sub-image overlapping arrangement planner 170, for examples, solves an overlapping arrangement plan optimization model M2 illustrated in FIG. 20. The overlapping arrangement plan optimization model M2 illustrated in FIG. 20 will be described later in detail.

Step S902: The sub-image overlapping arrangement planner 170 determines whether or not a solution is acquired by the process performed in Step S901. Then, the process proceeds to Step S904 in a case where the result of the determination is "Yes", and the process proceeds to Step S903 in a case where the result of the determination is "No". In a case where any solution is not acquired, it represents that, under a restriction that each sub image included in the score-attached sub image group D3 does not overlap with the other sub images and area images corresponding to the other sub images, the sub image cannot be arranged in the focused area that is the origin thereof in an overlapping manner. Thus, in a case where any solution is not acquired, a strategy of thinning out the sub images that are the arrangement targets is employed.

Step S903: The sub-image overlapping arrangement planner 170 excludes a sub image having the lowest integral score among sub images included in the score-attached sub image group D3 from the targets for the arrangement and registers the sub image in the removal list buffer B3, and the process is returned to Step S901.

The sub-image overlapping arrangement planner 170 acquires an optimal arrangement in a state in which some sub images included in the score-attached sub image group D3 are thinned out by repeating the process of Steps S901 to S903 described above. However, the arrangement acquired here is not necessarily be an optimal arrangement, and there is a possibility that the sub images are thinned out more than necessary. The reason for this is that, in Step S903, the sub images to be excluded from the targets for the arrangement are selected based on not the arrangement restriction but the integral score.

Thus, in the process of Step S904 and subsequent steps, it is determined whether or not a sub image that is once determined to be the thinning-out target can be arranged in the arrangement acquired until now. In a case where it is determined that the arrangement can be made, the arrangement is made as it is. Accordingly, a sub image that is an unnecessary thinning-out target is revived to be arranged during such a process.

Step S904: The sub-image overlapping arrangement planner 170 extracts sub images from the removal list buffer B3 in order of greatest to least integral score one at a time.

Step S905: The sub-image overlapping arrangement planner 170, under the restriction that an extracted sub image does not overlap with the other sub images or area images that are the origins of the other sub images, determines whether or not the extracted sub image can be arranged to overlap the focused area that is the origin of the sub image. The process proceeds to Step S906 in a case where the result of the determination is "Yes", and the process proceeds to Step S907 in a case where the result of the determination is "No".

Step S906: The sub-image overlapping arrangement planner 170 arranges the sub image determined to be arranged in Step S905 in the focused area that is the origin of the sub image in an overlapping manner. In addition, actually, although the optimization problem is solved also in the process of Steps S905 and S906, detailed description thereof will not be presented here.

Step S907: The sub-image overlapping arrangement planner 170 determines whether or not all the sub images have been extracted from the removal list buffer B3. Then, the process proceeds to Step S908 in a case where the result of the determination is "Yes", and the process is returned to Step S904 in a case where the result of the determination is "No".

Step S908: The sub-image overlapping arrangement planner 170 sets R'i (here, i=1, . . . , N) acquired as solutions as the arrangement plan information of the sub image and outputs the arrangement plan-attached sub image group D4.

Here, the numerical expression of the overlapping arrangement plan optimization model M2 used in Step S901 described above will be described with reference to FIG. 20. FIG. 20 is a diagram that illustrates an example of the overlapping arrangement plan optimization model M2.

In the overlapping arrangement plan optimization model M2 illustrated in FIG. 20, the first row represents that a sum of each linear sum of a distance between the focused area (area image) and a corresponding sub image and an area of the area image that is not hidden by the corresponding sub image but is visible for all the sub images is minimized. The definition of the distance and a calculation method thereof will be described later with reference to FIG. 22.

In the overlapping arrangement plan optimization model M2 illustrated in FIG. 20, the second row and subsequent rows represent restriction conditions. The third row applies a restriction, for the arrangement planned area of each sub image, that the closest focused area among all the focused areas is a focused area corresponding to the sub image. In other words, a sub image is required to be arranged so as to be closest to an area image corresponding to the focused area that is the origin of the sub image.

The fourth row applies a restriction that all the sub images do not overlap each other.

Figure 21:
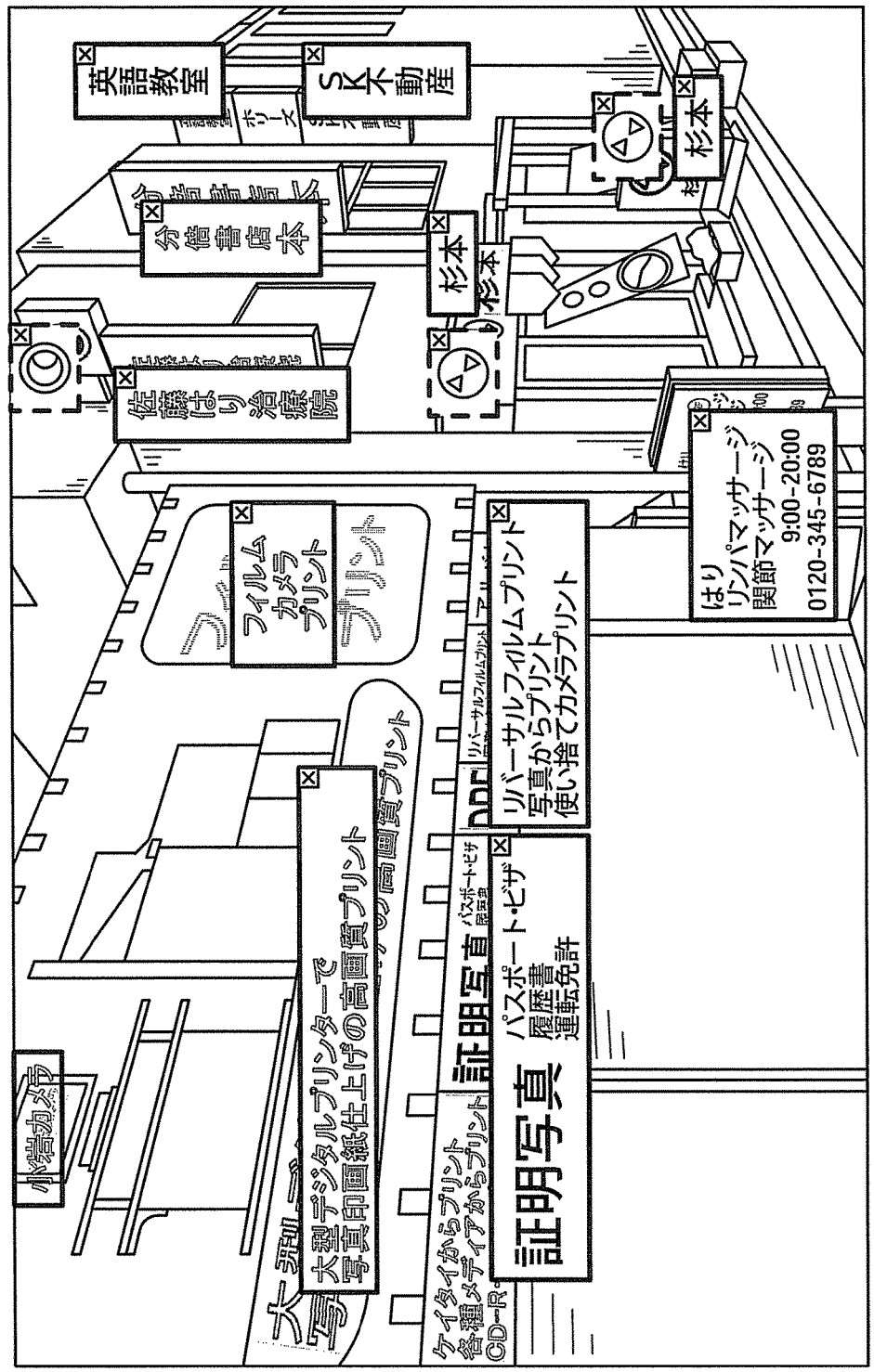
FIG. 21 is a diagram that illustrates an example of the arrangement of sub images according to arrangement plan information acquired as a solution of the overlapping arrangement plan optimization model.

FIG. 21 is a diagram that illustrates an example of the arrangement of sub images according to the arrangement plan information acquired as a solution of the overlapping arrangement plan optimization model M2 in the example of the detection result illustrated in FIG. 5. Each sub image is arranged to overlap a focused area (area image) that is the origin of the sub image and is arranged so as not to overlap the other sub images. However, in some areas, since this condition cannot be satisfied, the sub images are thinned out. For example, in a focused area including "ホリーズ" disposed on the upper right side in the figure and the like, the sub images are thinned out.

Here, the overlapping arrangement plan optimization model M2 illustrated in FIG. 20 is an example of the optimization model used by the sub-image overlapping arrangement planner 170, and the optimization model is not limited thereto. For example, in the overlapping arrangement plan optimization model M2 illustrated in FIG. 20, the upper limit of the number of sub images to be arranged may be inserted. Accordingly, inconvenience that images cannot be easily viewed due to an increase in the display number of sub images can be resolved.

Figure 22:
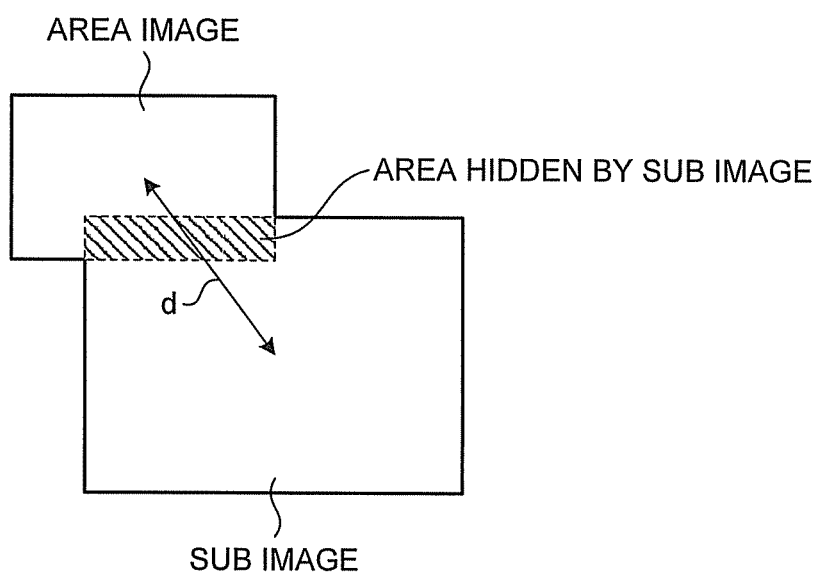
FIG. 22 is a diagram for explaining a method of calculating a distance between an area to be focused (area image) and a corresponding sub image.

FIG. 22 is a diagram for explaining a method of calculating a distance between a focused area (area image) and a corresponding sub image. The distance between the focused area (area image) and the sub image is acquired as a distance between rectangles. While the distance between rectangles may be considered in various manners, as illustrated in FIG. 22, a distance d between the centroids of the rectangles is set as the distance between the rectangles. In addition, the area of a portion to which hatching is applied in FIG. 22 is the value of a function S of the overlapping arrangement plan optimization model M2 illustrated in FIG. 20.

The arrangement plan-attached sub image group D4 generated as above, similar to the first embodiment, is output to both a sub-image display control unit 151 of the display control unit 150 and the recognition unit 140. Then, a process of immediately displaying a sub image on the display device 160 based on the arrangement plan information using the sub-image display control unit 151 and a process of recognizing targets (targets included in the focused area) such as characters and logo marks included in the sub image using the recognition unit 140 are performed in a parallel manner. In addition, when the recognition process for the sub image that is performed by the recognition unit 140 ends, similar to the first embodiment, the recognition result D5 is transmitted by the recognition result display control unit 152 of the display control unit 150 with one tempo being delayed from the display of the sub image and is displayed on the display device 160.

Figure 23:
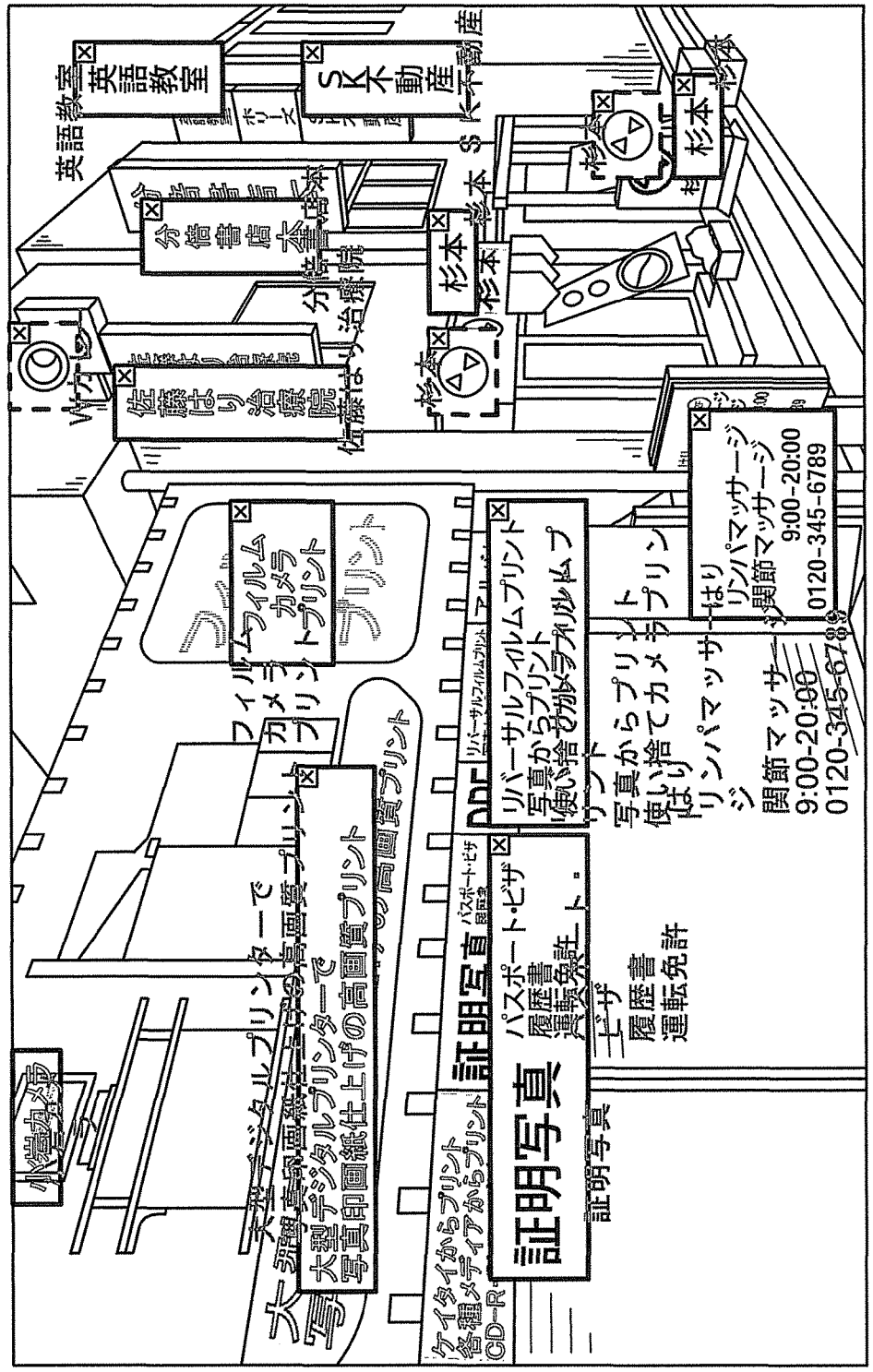
FIG. 23 is a diagram that illustrates an example of an image displayed on a display device as a result of the process performed by the recognition result display control unit.

FIG. 23 is a diagram that illustrates an example of an image displayed on the display device 160 as a result of the process performed by the recognition result display control unit 152. In the example of the image illustrated in FIG. 23, an example is illustrated in which the recognition result D5 is additionally displayed on the image illustrated in FIG. 21. On the display device 160, after the image illustrated in FIG. 21 is displayed, in a step in which the recognition process performed by the recognition unit 140 ends, the image illustrated in FIG. 23 is displayed.

In the display of the image that is performed by the display device 160, as described above, a best arrangement is made according to an algorithm of the sub-image overlapping arrangement planner 170 with the restriction being satisfied. More specifically, the sub images are arranged such that a sum of linear sums of distances between the centroids of the sub images and corresponding area images (focused areas) and the areas of the area images hidden by the sub images for all the sub images is minimized while two conditions that sub images of a same kind do not overlap each other, and that each sub image is arranged nearest to a corresponding area image (focused area) are satisfied. However, in a case where the restriction cannot be satisfied without any change, the restriction is satisfied by giving up the display of sub images of which the integral scores are low. Accordingly, there are cases where, since sub images are densely arranged, all the sub images cannot be arranged, and a local area in which sub images are thinned out occurs. For example, in the example of the image illustrated in FIG. 21 or 23, an upper right area of the image corresponds to this, and the sub image of the focused area including "ホリーズ" is not displayed in accordance with the thinning-out process.

On the other hand, a local area in which, since sub images are sparsely arranged, up to a sub image having a low integral score that is below the second threshold is displayed may occur. For example, in the example of the image illustrated in FIG. 21 or 23, an upper left area of the image corresponds to this, and since there is room in the space, a sub image of the focused area including "小岩カメラ" of which the integral score is below the second threshold is displayed as well.

In addition, in this embodiment, while a screen representation in which a sub image is arranged in the focused area (area image) in an overlapping manner is used as a screen representation that represents the correspondence relation between the sub image and the focused area (area image) disposed inside the input image D1 is used, the screen representation is not limited thereto. For example, in order to clearly represent the correspondence relation between the sub image and the focused area (area image) disposed inside the input image D1, a screen representation such a lead-out line may be additionally used in the overlapping arrangement or be independently used therein.

In this embodiment, as the screen representation that represents the correspondence relation between the recognition result D5 and the sub image, similar to the first embodiment, while a screen representation in which the recognition result D5 is arranged to partly overlap a corresponding sub image is used, the screen representation is not limited thereto. For example, various screen representations such as a screen representation using the above-described lead-out line and the like may be used.

Third Embodiment

Next, an image display apparatus according to a third embodiment will be described. While the image display apparatus according to the third embodiment has almost the same functions as the above-described image display apparatus according to the first embodiment, a method of displaying a sub image and a recognition result is different from that of the first embodiment. Hereinafter, the same reference sign will be assigned to the same constituent element as that of the image display apparatus of the first embodiment, duplicate description thereof will not be presented, and only characteristic parts of this embodiment will be described.

Figure 24:
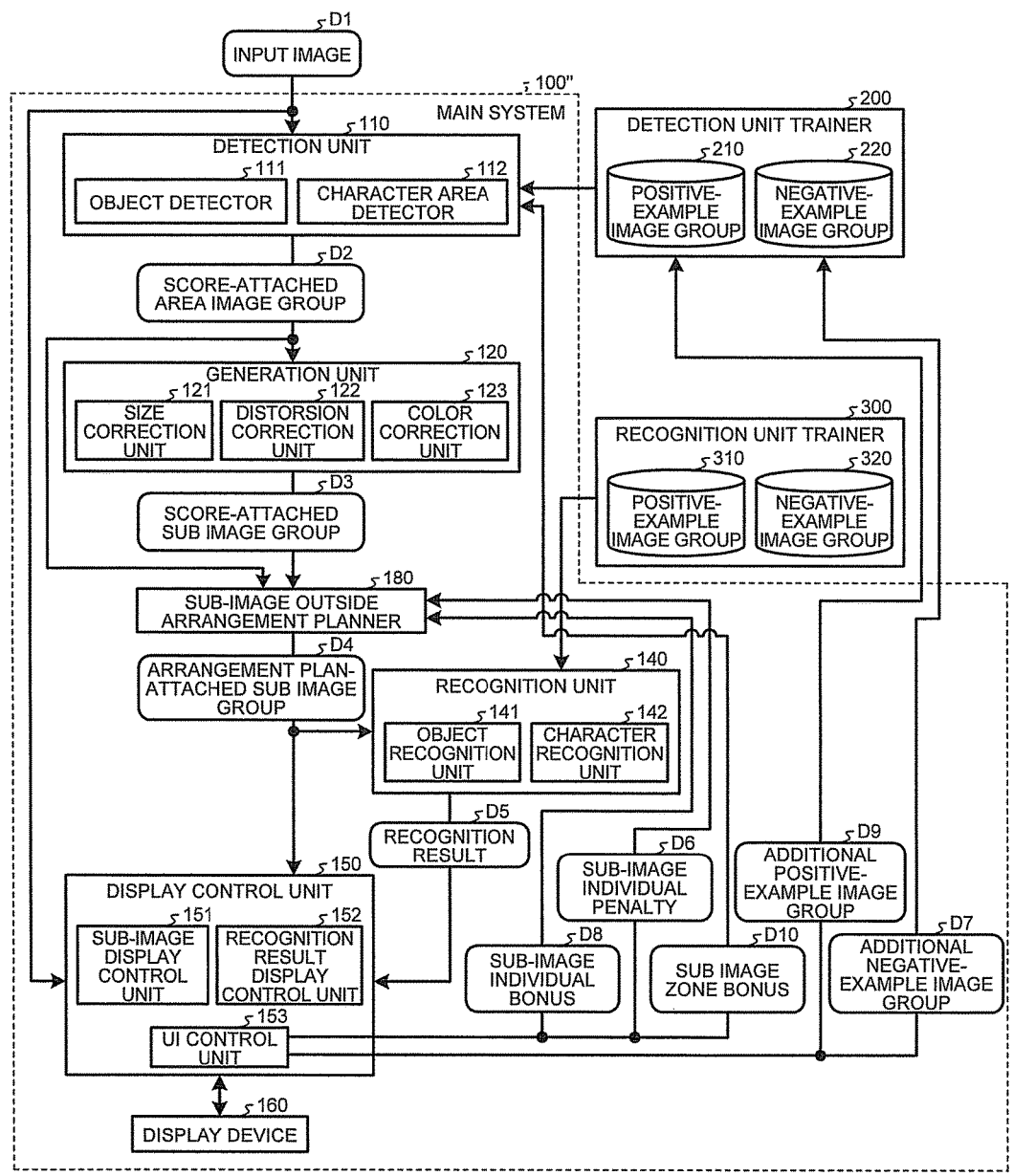
FIG. 24 is a block diagram that illustrates an example of the configuration of an image display apparatus according to a third embodiment.

FIG. 24 is a block diagram that illustrates an example of the configuration of the image display apparatus according to the third embodiment. In the image display apparatus of the third embodiment, as illustrated in FIG. 24, instead of the sub-image proximity arrangement planner 130 disposed in the main system 100 of the image display apparatus according to the first embodiment, a sub-image outside arrangement planner 180 is disposed in a main system 100". The other configurations of the image display apparatus according to the third embodiment are the same as those of the image display apparatus according to the first embodiment.

The sub-image outside arrangement planner 180 is a module that determines the position of a sub image at the time of displaying sub images outside the input image D1. The sub-image outside arrangement planner 180 receives the score-attached sub image group D3 as an input, determines an optimal arrangement of each sub image included in the score-attached sub image group D3, and outputs the arrangement plan-attached sub image group D4 including the arrangement plan information.

The arrangement plan-attached sub image group D4, similar to the first embodiment, is output to both a sub-image display control unit 151 of the display control unit 150 and the recognition unit 140. Then, a process of immediately displaying a sub image on the display device 160 based on the arrangement plan information by the sub-image display control unit 151 and a process of recognizing targets (targets included in the focused area) such as characters and logo marks included in the sub image by the recognition unit 140 are performed in a parallel manner. In addition, when the recognition process for the sub image that is performed by the recognition unit 140 ends, similar to the first embodiment, the recognition result D5 is displayed on the display device 160 with one tempo being delayed from the display of the sub image by the recognition result display control unit 152 of the display control unit 150.

Figure 25:
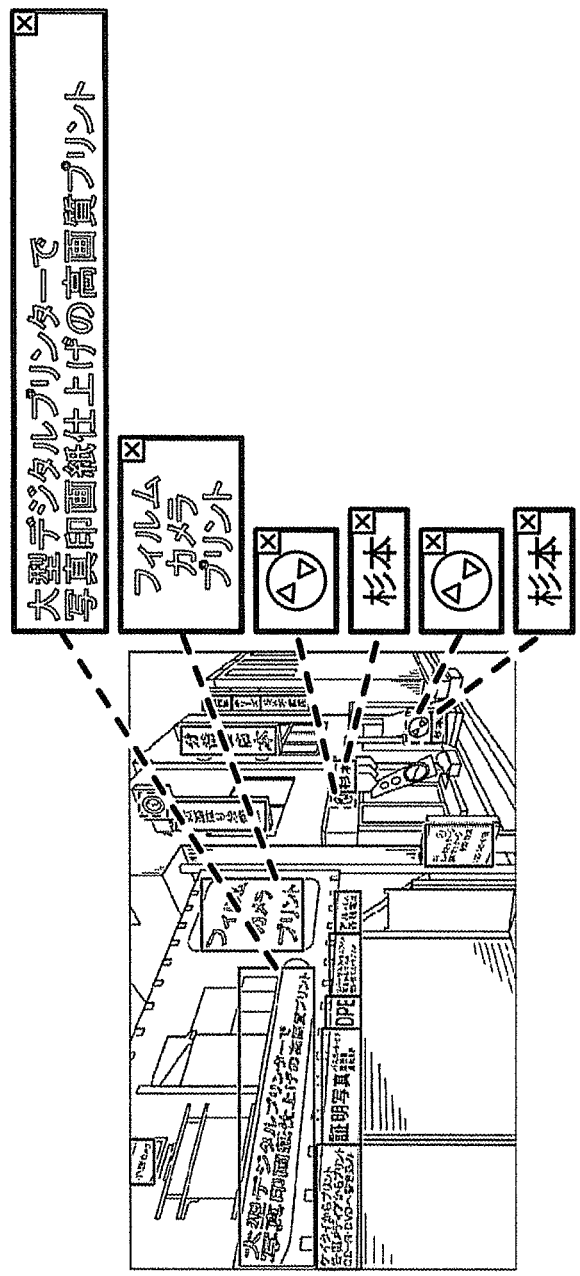
FIG. 25 is a diagram that illustrates an example of an image displayed on a display device as a result of the process performed by the sub-image display control unit.

FIG. 25 is a diagram that illustrates an example of an image displayed on the display device 160 as a result of the process performed by the sub-image display control unit 151 of the display control unit 150 based on the arrangement plan-attached sub image group D4 that is output from the sub-image outside arrangement planner 180.

In this embodiment, as illustrated in FIG. 25, the display screen of the display device 160 is laterally divided, an input image D1 from which focused areas are detected is displayed on the left-side screen, and sub images are displayed on the right-side screen. In the arrangement of each sub image on the right-side screen, for example, under the restriction that sub images do not overlap each other, as the position of a corresponding focused area on the input image D1 is disposed on the further upper side of the screen, the sub image is arranged on the further upper side of the right-side screen, and, as the integral score is higher, the sub image is arranged on the further upper side of the right-side screen. In addition, the correspondence relation between a sub image displayed on the right side of the screen and a focused area (area image) disposed inside the input image D1 arranged on the left side of the screen, for example, is explicitly represented by displaying a lead-out line linking these.

In addition, in this embodiment, as the screen representation representing the correspondence relation between a sub image and a focused area (area image) disposed inside of the input image D1, while an explicit representation method using the lead-out line linking the sub image and the corresponding focused area (area image) is used, the screen representation is not limited thereto. For example, instead of the screen representation using the lead-out lines, a highlighted representation may be configured to be used. More specifically, for example, when a mouse pointer is hold up over a focused area (area image) disposed inside the input image D1 or any one of the sub images, a screen representation in which a frame surrounding the corresponding sub image or the corresponding focused area (area image) is displayed to be highlighted may be considered.

Figure 26:
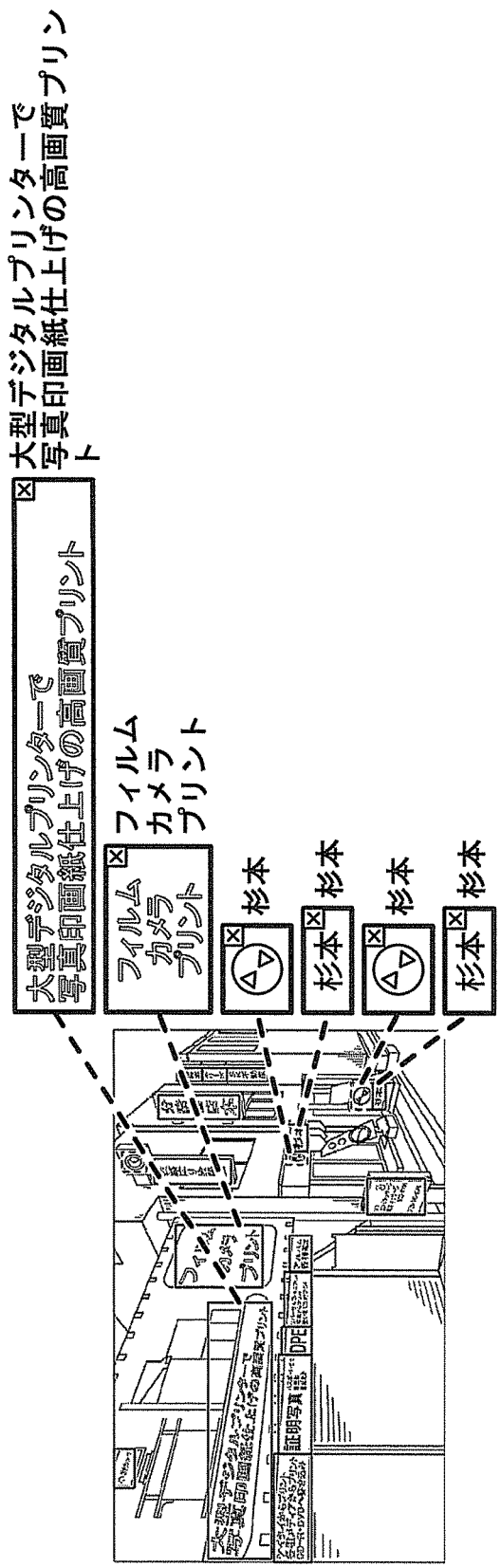
FIG. 26 is a diagram that illustrates an example of an image displayed on a display device as a result of the process performed by a recognition result display control unit.

FIG. 26 is a diagram that illustrates an example of the image displayed on the display device 160 as a result of the process performed by the recognition result display control unit 152 of the display control unit 150 based on the recognition result D5 that is output from the recognition unit 140. In this embodiment, as illustrated in FIG. 26, a display form is used in which, by arranging each recognition result D5 output from the recognition unit 140 to be neighboring to the right side of the sub image displayed on the right-side screen, the correspondence relation between the recognition result D5 and the sub image is represented.

The display methods of this embodiment illustrated in FIGS. 25 and 26 have an advantage that the input image D1 is not hidden by the sub images and the recognition results D5. However, there are disadvantages that the representation of associating is not slightly intuitive to persons, and the cost for moving the field of vision for checking the sub image or the recognition result occurs. Thus, in consideration of such advantages and disadvantages, it is preferable that an appropriate application using the display method according to this embodiment be selected, or switching from another display method to the display method according to this embodiment is performed in accordance with a user's selection.

According to the image display apparatus of each embodiment described above, it is possible to present targets, which are included in an input image and assumed to attract user's interest can be presented, to the user with high responsiveness in an easily understandable form.

Figure 27:
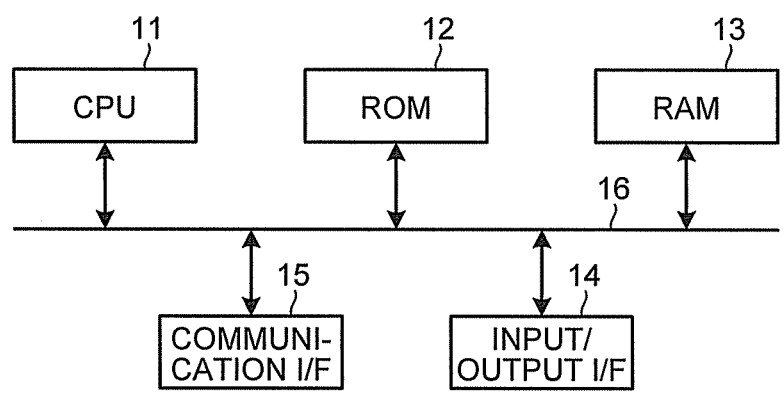
FIG. 27 is a diagram that illustrates the hardware configuration of an image display apparatus.

Each of the above-described functions of the image display apparatus according to each embodiment described above, for example, may be implemented by executing a predetermined program in the image display apparatus. In such a case, the image display apparatus, for example, as illustrated in FIG. 27, may have a hardware configuration using an ordinary computer that includes a control device such as a CPU (Central Processing Unit) 11, storage devices such as a ROM (Read Only Memory) 12 and a RAM (Random Access Memory) 13, an input/output I/F 14 to which the display device 160 and various operation devices are connected, a communication I/F 15 that is connected to the network and performs communication, and a bus 16 connecting the units together.

The program executed by the image display apparatus of each embodiment described above, for example, is recorded in a computer-readable recording medium such as a CD-ROM (Compact Disk Read Only Memory), a flexible disk (FD), a CD-R (Compact Disk Recordable), or a DVD (Digital Versatile Disc) as a file in an installable form or an executable form and is provided as a computer program product.

In addition, the program executed by the image display apparatus according to each embodiment described above may be configured to be stored in a computer connected to a network such as the Internet and be provided by being download through the network. Furthermore, the program executed by the image display apparatus of each embodiment described above may be configured to be provided or distributed through a network such as the Internet.

In addition, the program executed by the image display apparatus according to each embodiment described above may be configured to be provided with being built in the ROM 12 or the like in advance.

The program executed by the image display apparatus according to each embodiment described above has a module configuration that includes each processing unit (the detection unit 110, the generation unit 120, the sub-image proximity arrangement planner 130 (the sub-image overlapping arrangement planner 170 or the sub-image outside arrangement planner 180), the recognition unit 140, and the display control unit 150) of the image display apparatus. As actual hardware, for example, a CPU 11 (processor) reads the program from the recording medium and executes the read program, whereby each processing unit described above is loaded into a RAM 13 (main memory), and each processing unit described above is generated on the RAM 13 (main memory). In addition, in the image display apparatus according to each embodiment described above, some or all the processing units described above may be implemented by using dedicated hardware such as an ASIC (Application Specific Integrated Circuit) or an FPGA (Field-Programmable Gate Array).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image display apparatus comprising:
   a memory; and
   a processor configured to function as a detecting unit, a generating unit, a determining unit, a displaying control unit and a recognition unit, wherein
   the detecting unit detects areas to be noticed in an input image;
   the generating unit generates sub images corresponding respectively to the areas to be noticed by performing correction for improving visibility on respective images of the detected areas to be noticed;
   the arrangement determining unit determines an arrangement of the generated sub images on the input image so that the generated sub images do not overlap with remaining sub images or remaining areas to be noticed except for the areas to be noticed corresponding respectively to the generated sub images, and so that areas closest to respective planned areas of the generated sub images among the areas to be noticed are the areas to be noticed corresponding respectively to the generated sub images;
   the recognition unit performs a recognition process on a target included in each of the areas to be noticed; and
   the displaying control unit displays the generated sub images on a display device in accordance with the determined arrangement, and when the recognition process ends, the display control unit further displays a result of the recognition process on the display device in a form that accompanies a screen representation representing respective correspondence relations with the sub images, wherein
   the detecting unit detects, as the areas to be noticed, areas whose scores exceed a certain threshold, the scores representing a likelihood that the target for the recognition process is included in the input image,
   when a first operation designating a position at which the sub images do not overlap each other in the input image is performed, the display control unit sets bonus values which have a peak value at the designated position and are attenuated toward a periphery thereof, and
   when the bonus values are set, the detecting unit detects, as the areas to be noticed, areas whose scores having the bonus values added exceed a certain threshold.

2. The image display apparatus according to claim 1, wherein
   the recognition unit performs the recognition process on a target included in each of the areas to be noticed selected in accordance with a predefined rule among the areas to be noticed, and
   the display control unit displays a first sub image and a second sub image on the display device in mutually-different forms, the first sub image being generated from an image included in an area to be noticed that is selected as the target for the recognition process, and the second sub image being generated from an image included in another area to be noticed that is not selected as the target for the recognition process.

3. The image display apparatus according to claim 2, wherein, when a second operation designating the first sub image displayed on the display device is performed, the display control unit stops displaying the result of the recognition process that corresponds to the designated first sub image.

4. The image display apparatus according to claim 3, wherein
   the detection unit detects the areas to be noticed from the input image by using a discriminative model that is trained with training data set, and
   when the second operation is performed, the designated first sub image is added to the training data set as a negative example, and the discriminative model is retrained.

5. The image display apparatus according to claim 2, wherein, when a second operation designating the second sub image displayed on the display device is performed, the recognition unit performs the recognition process on a target included in an area to be noticed that corresponds to the designated second sub image.

6. The image display apparatus according to claim 5, wherein
   the detection unit detects the areas to be noticed from the input image by using a discriminative model that is trained with training data set, and
   when the second operation is performed, the designated second sub image is added to the training data set as a positive example, and the discriminative model is retrained.

7. The image display apparatus according to claim 1, wherein
   the arrangement determining unit removes some of the sub images from targets for the arrangement based on the score, and determines the arrangement of remaining sub images.

8. An image display method performed in an image display apparatus, the method comprising:
   detecting areas to be noticed in an input image;
   generating sub images corresponding respectively to the areas to be noticed by performing correction for improving visibility on respective images of the detected areas to be noticed;
   determining an arrangement of the generated sub images on the input image so that the generated sub images do not overlap with remaining sub images or remaining areas to be noticed except for the areas to be noticed corresponding respectively to the generated sub images, and so that areas closest to respective planned areas of the generated sub images among the areas to be noticed are the areas to be noticed corresponding respectively to the generated sub images;
displaying the generated sub images on a display device in accordance with the determined arrangement; and
determining the arrangement of the sub images outside the input image so that the sub images do not overlap each other, and so that the sub images are arranged vertically in an arrangement order in accordance with respective vertical positions of the areas to be noticed in the input image, wherein
the determining of the arrangement of the sub images outside the input image includes switching a display method in accordance with an operation of selecting either the determining of the arrangement of the generated sub images on the input image or the determining of the arrangement of the sub images outside the input image, and
when the determining of the arrangement of the sub images outside the input image is selected in accordance with the operation, the displaying includes displaying the sub images and the input image on the display device in accordance with the arrangement of the sub-image outside the input image.

9. A computer program product comprising a non-transitory computer-readable medium including computer-executable instructions for displaying an image, the instructions causing the computer to execute:
detecting areas to be noticed in an input image;
generating sub images corresponding respectively to the areas to be noticed by performing correction for improving visibility on respective images of the detected areas to be noticed;
determining an arrangement of the generated sub images on the input image so that the generated sub images do not overlap with remaining sub images or remaining areas to be noticed except for the areas to be noticed corresponding respectively to the generated sub images, and so that areas closest to respective planned areas of the generated sub images among the areas to be noticed are the areas to be noticed corresponding respectively to the generated sub images;
performing a recognition process on a target included in each of the areas to be noticed; and
displaying the generated sub images on a display device in accordance with the determined arrangement, and when the recognition process ends, the displaying includes further displaying a result of the recognition process on the display device in a form that accompanies a screen representation representing respective correspondence relations with the sub images, wherein
the detecting includes detecting, as the areas to be noticed, areas whose scores exceed a certain threshold, the scores representing a likelihood that the target for the recognition process is included in the input image,
when an operation designating a position at which the sub images do not overlap each other in the input image is performed, the displaying includes setting bonus values which have a peak value at the designated position and are attenuated toward a periphery thereof, and
when the bonus values are set, the detecting includes detecting, as the areas to be noticed, areas whose scores having the bonus values added exceed a certain threshold.

10. An image display apparatus comprising:
a memory; and
a processor configured to function as a detecting unit, a generating unit, a determining unit, a display control unit and a sub-image outside arrangement determining unit, wherein
the detecting unit detects areas to be noticed in an input image;
the generating unit generates sub images corresponding respectively to the areas to be noticed by performing correction for improving visibility on respective images of the detected areas to be noticed;
the arrangement determining unit determines an arrangement of the generated sub images on the input image so that the generated sub images do not overlap with remaining sub images or remaining areas to be noticed except for the areas to be noticed corresponding respectively to the generated sub images, and so that areas closest to respective planned areas of the generated sub images among the areas to be noticed are the areas to be noticed corresponding respectively to the generated sub images;
the displaying control unit displays the generated sub images on a display device in accordance with the determined arrangement; and
the sub-image outside arrangement determining unit determines the arrangement of the sub images outside the input image so that the sub images do not overlap each other, and so that the sub images are arranged vertically in an arrangement order in accordance with respective vertical positions of the areas to be noticed in the input image, wherein
the display control unit has a function of switching a display method in accordance with an operation of selecting either the arrangement determining unit or the sub-image outside arrangement determining unit, and
when the sub-image outside arrangement determining unit is selected in accordance with the operation, the display control unit displays the sub images and the input image on the display device in accordance with the arrangement determined by the sub-image outside arrangement determining unit.

11. An image display method performed in an image display apparatus, the method comprising:
detecting areas to be noticed in an input image;
generating sub images corresponding respectively to the areas to be noticed by performing correction for improving visibility on respective images of the detected areas to be noticed;
determining an arrangement of the generated sub images on the input image so that the generated sub images do not overlap with remaining sub images or remaining areas to be noticed except for the areas to be noticed corresponding respectively to the generated sub images, and so that areas closest to respective planned areas of the generated sub images among the areas to be noticed are the areas to be noticed corresponding respectively to the generated sub images;
performing a recognition process on a target included in each of the areas to be noticed; and
the displaying control unit displays the generated sub images on a display device in accordance with the determined arrangement, and when the recognition process ends, the displaying includes further displaying a result of the recognition process on the display device in a form that accompanies a screen representation representing respective correspondence relations with the sub images, wherein the detecting includes detecting, as the areas to be noticed, areas whose scores exceed a certain threshold, the scores representing a likelihood that the target for the recognition process is included in the input image, when an operation designating a position at which the sub images do not overlap each other in the input image is performed, the displaying includes setting bonus values which have a peak value at the designated position and are attenuated toward a periphery thereof, and when the bonus values are set, the detecting includes detecting, as the areas to be noticed, areas whose scores having the bonus values added exceed a certain threshold.

12. A computer program product comprising a non-transitory computer-readable medium including computer-executable instructions for displaying an image, the instructions causing the computer to execute:

detecting areas to be noticed in an input image;

generating sub images corresponding respectively to the areas to be noticed by performing correction for improving visibility on respective images of the detected areas to be noticed;

determining an arrangement of the generated sub images on the input image so that the generated sub images do not overlap with remaining sub images or remaining areas to be noticed except for the areas to be noticed corresponding respectively to the generated sub images, and so that areas closest to respective planned areas of the generated sub images among the areas to be noticed are the areas to be noticed corresponding respectively to the generated sub images; and displaying the generated sub images on a display device in accordance with the determined arrangement;

determining the arrangement of the sub images outside the input image so that the sub images do not overlap each other, and so that the sub images are arranged vertically in an arrangement order in accordance with respective vertical positions of the areas to be noticed in the input image, the displaying includes switching a display method in accordance with an operation of selecting either the determining of the arrangement of the generated sub images on the input image or the determining of the arrangement of the sub images outside the input image, and when the determining of the arrangement of the sub images outside the input image is selected in accordance with the operation, the displaying includes displaying the sub images and the input image on the display device in accordance with the arrangement of the sub images outside the input image.

* * * * *